United States Patent [19]
Kim et al.

[11] Patent Number: 5,945,766
[45] Date of Patent: *Aug. 31, 1999

[54] CORELESS-TYPE BLDC MOTOR AND METHOD OF PRODUCING STATOR ASSEMBLY HAVING AXIAL VIBRATION ATTENUATION ARRANGEMENT

[75] Inventors: Byungkyu Kim; Joon Kim, both of Seoul, Rep. of Korea; Boris Bazarov, Petersburg, Russian Federation; Donghoon Kim, Seoul, Rep. of Korea

[73] Assignee: Amotron Co., Ltd., Kyungki-Do, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/783,908

[22] Filed: Jan. 16, 1997

[51] Int. Cl.$^6$ ............................ H02K 16/02; H02K 16/00
[52] U.S. Cl. ........................... 310/268; 310/268; 310/89; 310/71; 310/43
[58] Field of Search ................................. 310/266, 268, 310/71, 112, 89, 194, 43

[56] References Cited

U.S. PATENT DOCUMENTS

| | | | |
|---|---|---|---|
| 1,566,693 | 12/1925 | Pletscher | 310/268 |
| 3,579,277 | 5/1971 | Imahashi | 310/156 |
| 3,953,751 | 4/1976 | Merkle et al. | 310/91 |
| 3,999,092 | 12/1976 | Whiteley | 310/156 |
| 4,007,390 | 2/1977 | Muller et al. | 310/90 |
| 4,072,881 | 2/1978 | Ban | 318/138 |
| 4,187,441 | 2/1980 | Oney | 310/112 |
| 4,517,484 | 5/1985 | Dacier | 310/266 |
| 4,536,672 | 8/1985 | Kanayama et al. | 310/268 |
| 4,578,606 | 3/1986 | Welterlin | 310/68 R |
| 4,629,920 | 12/1986 | Hermann | 310/156 |
| 4,633,149 | 12/1986 | Welterlin | 318/254 |
| 4,961,017 | 10/1990 | Kakinoki et al. | 310/71 |
| 5,057,726 | 10/1991 | Mole et al. | 310/67 R |
| 5,289,069 | 2/1994 | Kasegawa et al. | 310/156 |
| 5,440,185 | 8/1995 | Allwine, Jr. | 310/156 |
| 5,610,457 | 3/1997 | Kurita | 310/68 B |
| 5,623,178 | 4/1997 | Kawabata et al. | 310/260 |

*Primary Examiner*—Nestor Ramirez
*Assistant Examiner*—Karl Imayoshi Tamai
*Attorney, Agent, or Firm*—McDermott, Will & Emery

[57] ABSTRACT

A double rotor-type brushless direct-current motor includes first and second annular-shaped rotors each having a plurality of north and south-polar magnets which are alternately disposed at a predetermined distance; a rotating shaft connected to a central portion of the rotors thorough a bushing; upper and lower cases receiving and rotatably supporting opposite ends of the rotating shaft; an annular-shaped stator having a plurality of stator coils supported by a molding filler to apply electromagnetic force to the first and second rotors in an opposite direction to each other, the stator being mounted between the first and second rotors at a predetermined clearance; and a control printed circuit board for applying a driving current with respect to the stator, the control printed circuit board being mounted one of the upper and lower cases; wherein the upper and lower cases, the control printed circuit board, the first and second rotors have a plurality of ventilating holes for circulating air from the outer side of the motor to the inside of the motor.

14 Claims, 18 Drawing Sheets

CORELESS-TYPE BLDC MOTOR AND METHOD OF PRODUCING STATOR ASSEMBLY HAVING AXIAL VIBRATION ATTENUATION ARRANGEMENT

BACKGROUND OF THE INVENTION

1. Field of the Invention

The present invention relates to coreless-type brushless direct-current("BLDC") motor and a method of producing stator assembly. More particularly, it relates to a double rotor/stator-type coreless BLDC motor and a method for making its stator assembly which doubles advantages of the conventional respective core and coreless DC motors and obviates their disadvantages by symmetrically providing a pair of disk-shaped rotors to upper and lower parts of a disk-shaped stator or by symmetrically mounting rotors between a pair of stators, thereby avoiding the rotor's axial vibration, creating high torque, and minimizing power consumption.

2. Description of the Related Art

Coreless-type BLDC motors may be classified into cylindrical core (radial) and coreless (axial) ones depending on whether a stator core exists.

The core-type BLDC motors are characterized as an internal magnet-type motor and an external magnet-type motor. The internal magnet-type motor includes a cylindrical coil-wound stator and a rotor of cylindrical permanent magnets provided to a plurality of protrusions formed on its inner circumference so as to be of electromagnetic construction. In the external magnet-type motor, a stator around which a coil is wound and a rotor having cylindrical permanent magnets are provided to a plurality of protrusions formed on its outer circumference.

Since its magnetic circuit has an axial-symmetric structure, the core BLDC motor makes little noise during operation and is suitable for low-speed rotation, creating desirable torque. This core BLDC motor, however, results in a waste of materials for making a stator and requires great expense for facility investment for mass production. In addition, since the core BLDC motor's stator and rotor are of complicated structure, it is not easy to make the motor compact, and it cannot assure high efficiency or the production of desirable amounts of torque.

A coreless BLDC motor was proposed in order to solve the above-described problems. Referring to a coreless BLDC motor depicted in FIG. 1, rotors 5 that each consists of an annular magnet 1 and a yoke 3 are fixed to a shaft 7, and stators 13 around which a plurality of bobbinless-rectangular stator coils 11 are wound are fixed to a casing 10. One end of the shaft 7 is rotatably joined to the casing 10 by means of a pair of bearings 15.

This coreless BLDC motor has a magnetic circuit axially created between the rotors 5 consisting of a set of N-and-S-pole magnets 5A and 5B (refer to FIG. 3) and the stators 13 about which a plurality of the stator coils 11 generating electromagnetic force are wound. Thus, even if a buffer spring 17 is inserted between a pair of the bearings 15, the coreless BLDC motor generates great axial vibrations due to the stators' attracting or repelling force and their unequal magnetization. Besides, the axial vibrations induces a resonance of the overall system employing the coreless BLDC motor during operation, thereby increasing the noise. Accordingly, the motor's efficiency is not decreased during high-speed rotation but gives rise to much noise.

In conclusion, the above-described coreless BLDC motor saves materials and has an advantageous yield aspect compared to the core BLDC motor. Moreover, it is possible to make it compact, which lowers the overall production costs and enhances its efficiency. The coreless BLDC motor, however, creates much noise due to axial vibrations during operation.

SUMMARY OF THE INVENTION

It is a primary objective of the present invention to provide a double rotor/double stator-type coreless brushless direct-current (BLDC) motor which counteracts axial vibrations created during operation, and makes torque double or more.

It is a second objective of the present invention to provide a coreless-type brushless direct-current (BLDC) motor which has a multi-stage structure to be of increased capacity and has a power-saving function, lowering the overall production costs.

It is a third objective of the present invention to provide a coreless-type brushless direct-current (BLDC) motor which employs a plurality of angled bobbin coils and makes it easy to connect adjacent stages.

It is a fourth objective of the present invention to provide a method of manufacturing a bobbin-type stator assembly used for a brushless direct-current (BLDC) motor which provides reliable insulation between angled coils, and is of damp-proof and rust-proof structure.

It is a fifth objective of the present invention to provide a method of manufacturing a molding-type stator assembly used for a brushless direct-current (BLDC) motor which provides reliable insulation between angled coils, and is of damp-proof and rust-proof structure.

It is a sixth objective of the present invention to provide a double rotor/single stator-type coreless brushless direct-current (BLDC) motor which employs a molding-type stator assembly to facilitate mutual connection of adjacent stages, and is of small size and light weight to thereby save the total production costs.

It is a seventh objective of the present invention to provide a double rotor-type coreless brushless direct-current (BLDC) motor which has an air-cooling structure in which holes for removing heat generated from drive coils and drive elements are defined on each of double rotor and upper/lower cases.

According to one aspect of the present invention, a coreless-type brushless direct-current motor of a double rotor-type comprises first and second annular-shaped rotors each having a plurality of north-polar magnets and south-polar magnets arranged alternately each other, the first and second rotors being disposed opposing to each other such that the corresponding magnets have an opposite polarity to each other; a rotating shaft connected to a central portion of the rotors through a bushing; a cylindrical case rotatably supporting opposite ends of the rotating shaft; and first and second annular-shaped stators each having a plurality of bobbinless stator coils for applying electromagnetic force to the first and second rotors in an opposite direction to each other, the first and second stators being mounted between the first and second rotors at a predetermined clearance.

To increase output of the motor, the motor further comprises the same elements as defined above, which are arranged in an axial direction.

According to another aspect of the present invention, a double rotor/stator-type brushless direct-current motor comprises first and fourth annular-shaped rotors arranged at a predetermined distance each having a plurality of north-polar and south-polar magnets which are alternately disposed; second and third annular-shaped rotors each having a plurality of north-polar and south-polar magnets which are alternately disposed, said second and third rotors being disposed between the first and fourth rotors; a rotating shaft connected to a central portion of the rotors through bushings; left and right cases rotatably supporting the rotating shaft; a middle case connecting the left and right cases; first and second annular-shaped stators each having a plurality of bobbinless coils for applying electromagnetic force to the first and second rotors in an opposite direction to each other, the first and second stators being mounted on opposite sides of a printed circuit board which is fixed by the left and middle cases; and third and fourth annular-shaped stators each having a plurality of bobbinless coils for applying electromagnetic force to the third and fourth rotors in an opposite direction to each other, the first and second stators being mounted on opposite sides of a printed circuit board which is fixed by the right and middle cases.

According to still another aspect of the present invention, a single rotor/double stator-type brushless direct-current motor, comprises an annular-shaped rotor having a plurality of north-polar and south-polar magnets which are alternately disposed; a rotating shaft coupled to a central portion of the rotor through a bushing; a cylindrical case receiving and rotatably supporting opposite ends of the rotating shaft; and first and second annular-shaped stators each having a plurality of bobbinless coils for applying electromagnetic force to the rotor in an opposite direction to each other, the first and second stators being mounted on opposite inner sides of the cylindrical case.

Preferably, the rotor comprises a support made of a non-magnetic material on which the magnets are inserted at a predetermined distance.

According to still another aspect of the present invention, a double rotor/single stator-type brushless direct-current motor comprises first and second annular-shaped rotors arranged a predetermined distance each having a plurality of north-polar and south-polar magnets which are alternately disposed; a rotating shaft connected to a central portion of the rotors through a bushing; upper and lower cases rotatably supporting the rotating shaft; and an annular-shaped stator having a plurality of stator coils for applying electromagnetic force to the first and second rotors in an opposite direction to each other, the stator being mounted between the first and second rotors and formed in an annual shape by molding filler, an outer circumference of the stator being fixed between the upper and lower cases..

Preferably, the stator comprises a plurality of wound coils, a stator body for supporting the wound coils in a annual shape and sealing an exposed portion of the wound coils, and an auxiliary printed circuit board mounted on an one face of the body for electrically interconnecting the coils.

According to yet another aspect of the present invention, a method for making a stator of a coreless brushless direct-current motor, comprising the steps of providing a plurality of stator coils by winding an insulation coil on bobbins using a winder; electrically connecting the stator coils to a printed circuit board having a central hole; and forming the stator by insert molding to seal an exposed portion of the stator coils with a moulding filler, thereby having an annular shape with a central hole.

According to still another aspect of the present invention, a method for making a stator of a coreless brushless direct-current motor, comprising the steps of disposing a plurality of wound coils on a printed circuit board at a same distance and interconnecting terminals of the coils; and forming the stator by insert molding to seal an exposed portion of the stator coils with a moulding filler, thereby providing an annular-shape with a central hole.

Preferably, each of the wound coil is obtained by winding an insulating coil around the bobbin by using a general winder.

According to yet another aspect of the present invention, a stator of a coreless brushless direct-current motor comprises a plurality of wound coils; an annular-shaped stator body formed by filling a filler between the coils; and a printed circuit board attached on one face of the body and interconnecting the coils.

According to still another aspect of the present invention, a double rotor-type brushless direct-current motor comprises first and second annular-shaped rotors each having a plurality of north and south-polar magnets which are alternately disposed at a predetermined distance; a rotating shaft connected to a central portion of the rotors through a bushing; upper and lower cases receiving and rotatably supporting opposite ends of the rotating shaft; an annular-shaped stator having a plurality of stator coils supported by a molding filler to apply electromagnetic force to the first and second rotors in an opposite direction to each other, the stator being mounted between the first and second rotors at a predetermined clearance; and a control printed circuit board for applying a driving current with respect to the stator, the control printed circuit board being mounted one of the upper and lower cases; wherein the upper and lower cases, the control printed circuit board, the first and second rotors have a plurality of ventilating holes for circulating air from the outer side of the motor to the inside of the motor.

BRIEF DESCRIPTION OF THE DRAWING

A more complete appreciation of this invention, and many of the attendant of advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Preferred embodiments will be now described with reference to the accompanying drawings.

The term "motor" denotes a coreless brushless direct-current (BLDC) motor throughout the specification of the present invention, and it should be understood that the present invention is applicable to the other motors as well as the coreless BLDC motor.

Figure 2:
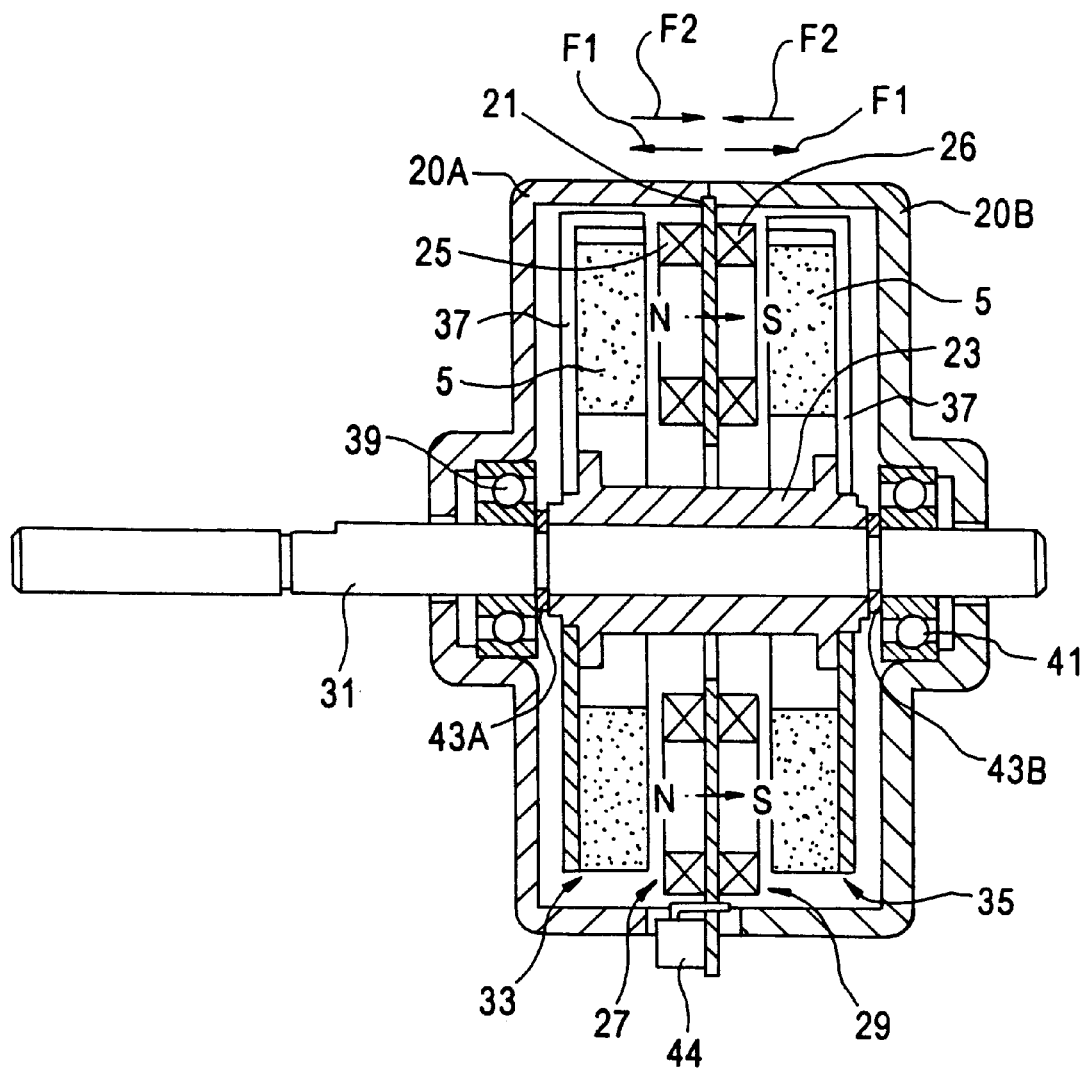
FIG. 2 is an axial-sectional view illustrating a coreless BLDC motor of a double rotor/stator-type according to a first embodiment of the present invention.

Referring first to FIG. 2, a BLDC motor of a first preferred embodiment includes first and second stators 27 and 29 that are provided to both sides of a printed circuit board 21 fixed between left and right cases 20A and 20B and each have a plurality of bobbinless stator coils 25 and 26; and first and second rotors 33 and 35 which are provided to the left of the first stator 27 and the right of the second stator 29, respectively.

Figure 3:
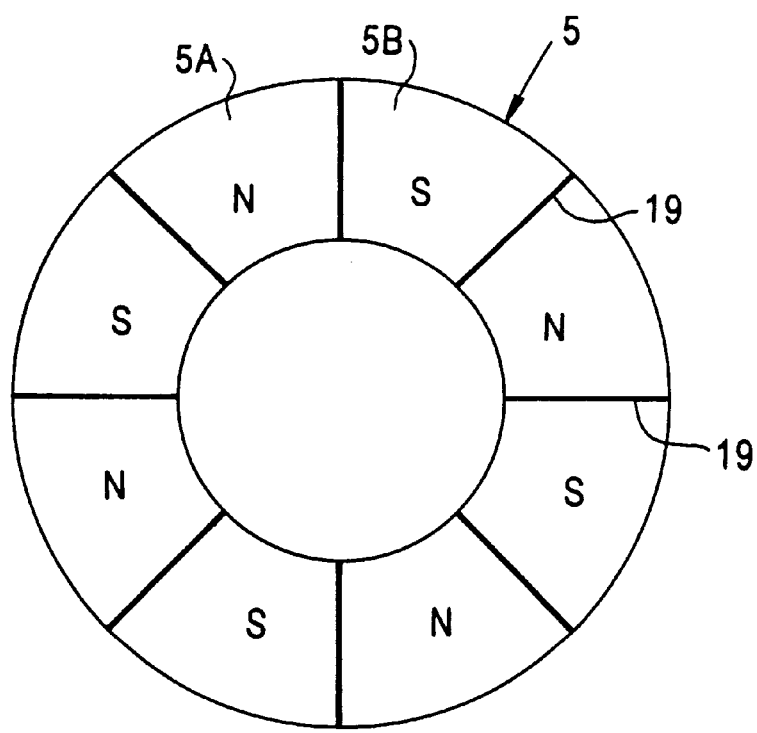
FIG. 3 is a plane view of a rotor depicted in FIG. 2.

As shown in FIG. 3, each of the first and second rotors 33 and 35 is configured in an annular-shape and comprised of a yoke 37 and a field magnet 5 with the N and S poles 5A and 5B alternately magnetized.

The first and second stators 27 and 29 have the same structure as each other. For example, when a three-phase drive manner is used, the first stator 27 comprises three stator coils 25 which are coiled around the left side of the printed circuit board 21, in a fan-shape, in a bobbinless manner and are connected to each other in a Y-configuration manner. When a two-phase drive manner is used, the first stator comprises two stator coils 25 which are series-connected to each other. In addition, the second stator 29 has stator coils 26 which are also mounted on the right side of the printed circuit board 21 in the same manner as that of the stator coils 25.

In the tree-phase drive manner, three stator coils 25 are separated into six coils, and in the two-phase drive manner, two stator coils 25 are separated into eight coils.

At this point, the coiling and electric current flow directions of the first and second stator coils 25 and 26 are determined such that if the corresponding magnets of the first and second rotors 33 and 35 have the same pole as each other, the direction of the magnetic force of the first stator coils 25 is established to be opposite to that of the second stator coil 26. At this point, it should be noted that coil yokes are disposed between the printed circuit board 21 and the coils 25 and 26 to avoid offset magnetic circuit affection. On the contrary, when the magnets of the first and second rotors 33 and 35, which are disposed to be opposite to each other, have opposite polarities to each other, the first and second coils 25 and 26 are mounted such that their directions of coiling and electric current flow are established so that the magnetic force directions of them have the same magnetic flux direction as each other. Central portions of the left and right cases 20A and 20B are rotatably connected to the rotating shaft 31 of the rotors 33 and 35 through respectively left and right bearings 39 and 41. A pair of E-ring 43A and 43B are coupled between a bushing 23 and the bearings 39 and 41 so as to fix the bushing 23. A connector 44 is fixed on one side of the printed circuit board 21 so as to supply a drive current to the stator coils 25 and 26.

In addition, in the motor according to the present invention, each of the rotors 33 and 35 has a magnet structure which can be configured having an annular-shape with a multi-polarized magnetized magnets as shown in FIG. 3. The magnet structure can be also configured having an annular-shape with a plurality of separate magnets which are multi-polarized as shown in FIGS. 4A and 4B.

Figure 4A:
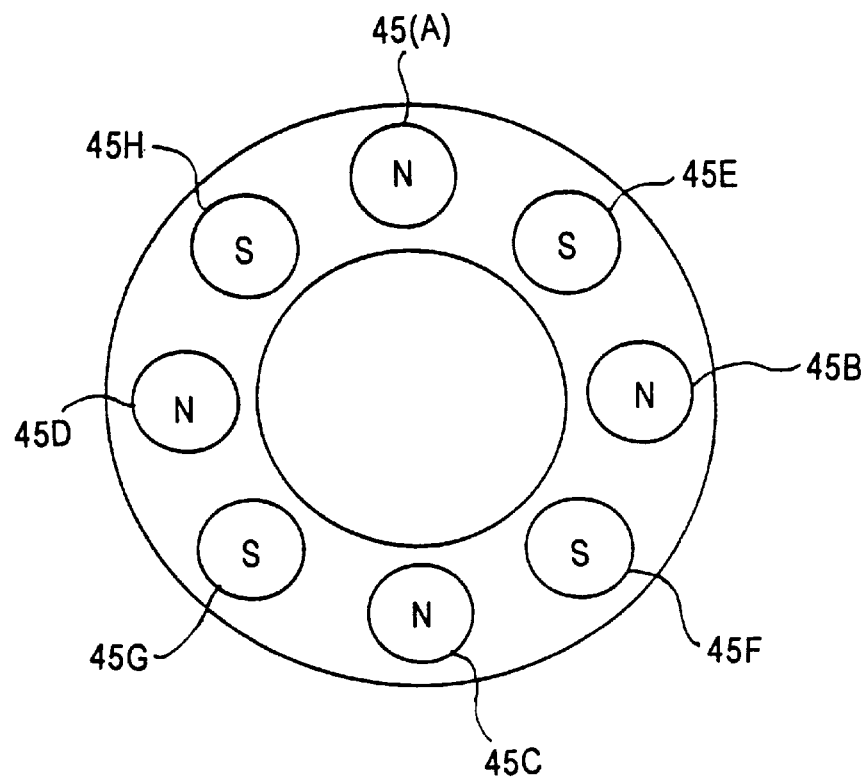
FIGS. 4A and 4B are respectively plane and side views illustrating a rotor of a modified example of the first embodiment of the present invention.
Figure 4B:
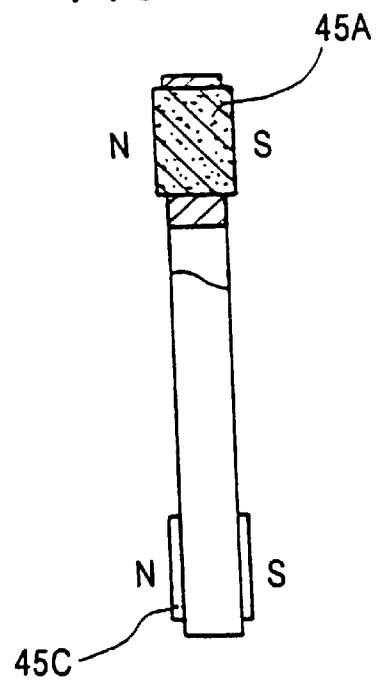

That is, as shown in FIGS. 4A and 4B, the separate magnet structure has four separate north pole magnets 45A, 45B, 45C and 45D and four separate south pole magnets 45E, 45F, 45G and 45H, all of which are inserted into a support 47 made of a non-magnetic material.

Such a separate magnet structure has an advantage in that the manufacturing cost can be reduced since a portion which does not affect on the operation of the rotor is made of the non-magnetic material.

Figure 5:
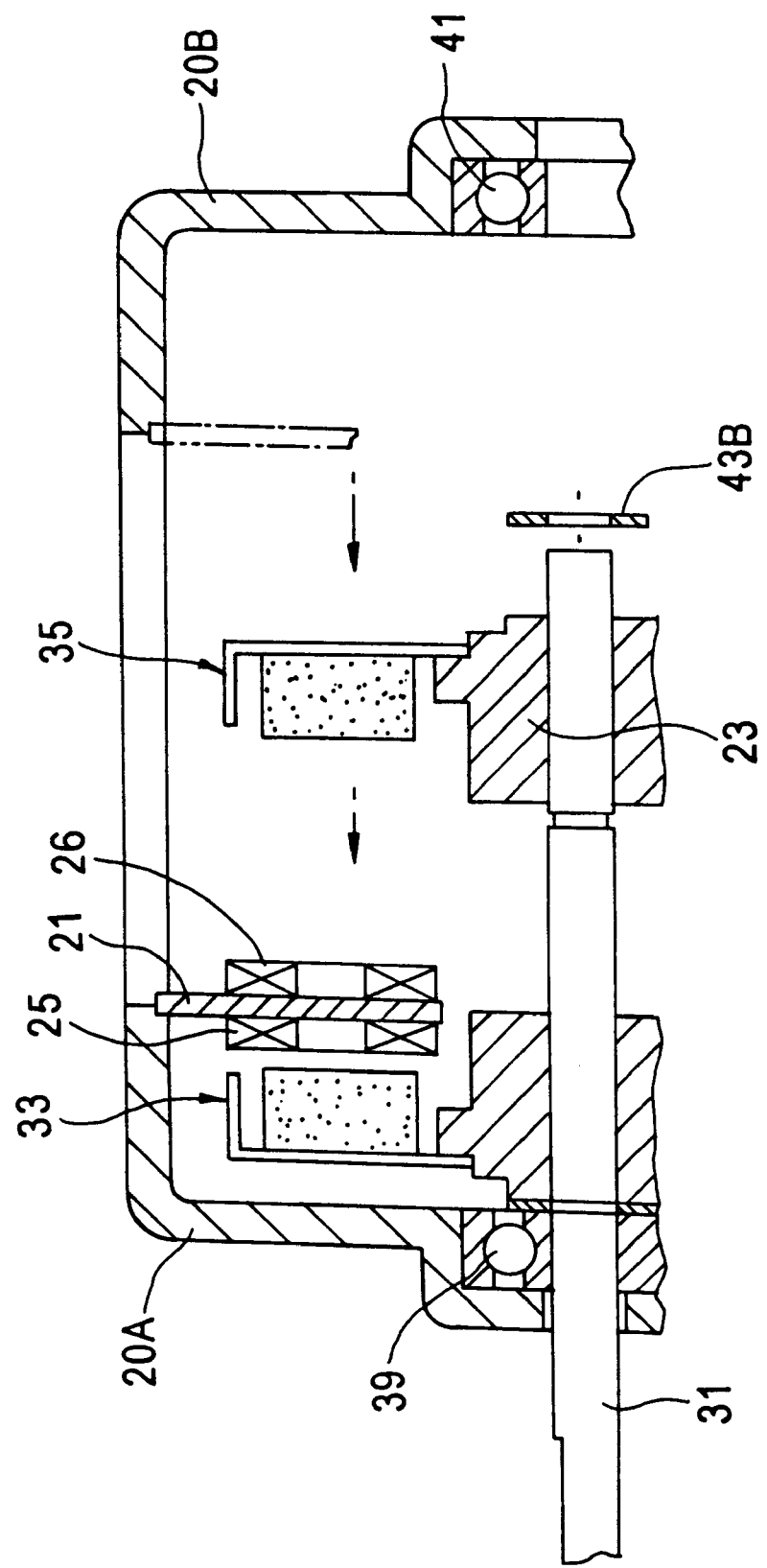
FIG. 5 is a partial exploded perspective view illustrating a method for assembling the motor depicted in FIG. 2.

Referring to FIG. 5, there is shown a partial cut-away sectional view illustrating a method for assembling the motor according to the first embodiment of the present invention.

To assembly the motor, the rotating shaft 31 on which the E-ring 43A and the bushing 23 for supporting the first rotor 33 are mounted is first coupled to the left case 20A provided with the left bearing 39 on its central concave portion, and then the printed circuit board 21 on which the first and second stators 27 and 29 are mounted is assembled.

Next, the bushing on which the second rotor 35 is fixed is coupled to the rotating shaft 31 and then fixed by the E-ring 43B. Finally the right case 20B on which the right bearing 41 is fixed is assembled and fixed on the printed circuit board 21.

The operation and efficiency of the above described coreless BLDC motor according to the first embodiment will be described hereinafter.

As shown in FIG. 2, the first and second stators 27 and 29 for driving the first and second rotors 33 and 35, respectively, are symmetrically disposed between the first and second rotors 33 and 35. The coiling and electric current flow directions of the corresponding coils 25 and 26 of the first and second stators 27 and 29 are established such that the magnetic flux directions of them can be the same as each other or opposite to each other.

Therefore, if the directions of electromagnetic forces formed by the stator coils 25 and 26 are set in the opposite or equal direction to each other and magnets of equal or opposite polarity are disposed between the first and second rotors 33 and 35, the same repulsive forces F1 or attractions F2 act between the corresponding stator coils 25 and 26.

At this point, the repulsive forces F1 or attraction F2 between the first stator 27 and the first rotor 33 and the repulsive force F1 or attraction F1 between the second stator 29 and the second rotor 35 are offset since they acts in the opposite direction to each other. As a result, when the rotors rotate, the axial vibration thereof can be minimized.

In addition, since the above described double rotor/stator structure has the field magnet and the stator coil, each of which is made in an double structure, the current flowing along the coil and the magnetic flux density become two times the single stator structure, thereby increasing drive torque and output of the motor as much as two times those of the single stator.

Further, in the conventional motor, as the output of the motor increases, the axial vibration increases in proportion to the increase of the output. However, in the present invention, as the output of the motor increases, the vibration decreases.

Figure 6:
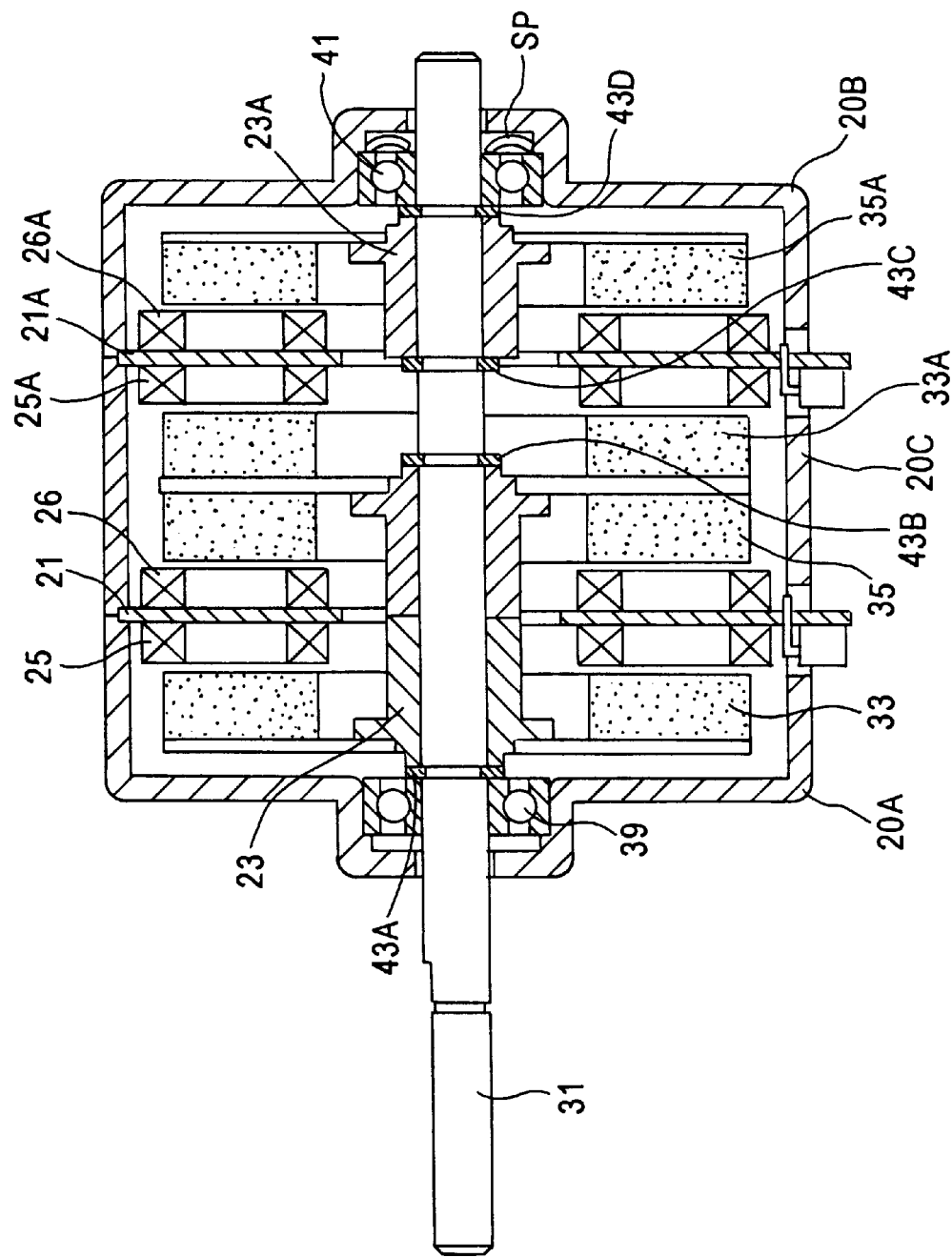
FIG. 6 is a sectional view illustrating a coreless BLDC motor of a dual-stage double-rotor/stator-type which is a modified example of the first embodiment of the present invention.

Referring to FIG. 6, there is shown a two-stage sectional view illustrating a two-stage double-rotor/stator BLDC motor according to a first embodiment of the present invention. As shown in drawing, there is provided a two-stage BLDC motor. E-rings 43A and 43B are coupled to opposite ends of the bushing 23, respectively. E-rings 43C and 43D are respectively coupled to opposite ends of the bushing 23A. A medium case 20C is further provided between left and right cases 20A and 20B.

Since the operation of this two-stage double-rotor/stator BLDC motor is the same as that of the single BLDC motor depicted in FIG. 2, the description thereof will be omitted herein.

Figure 7:
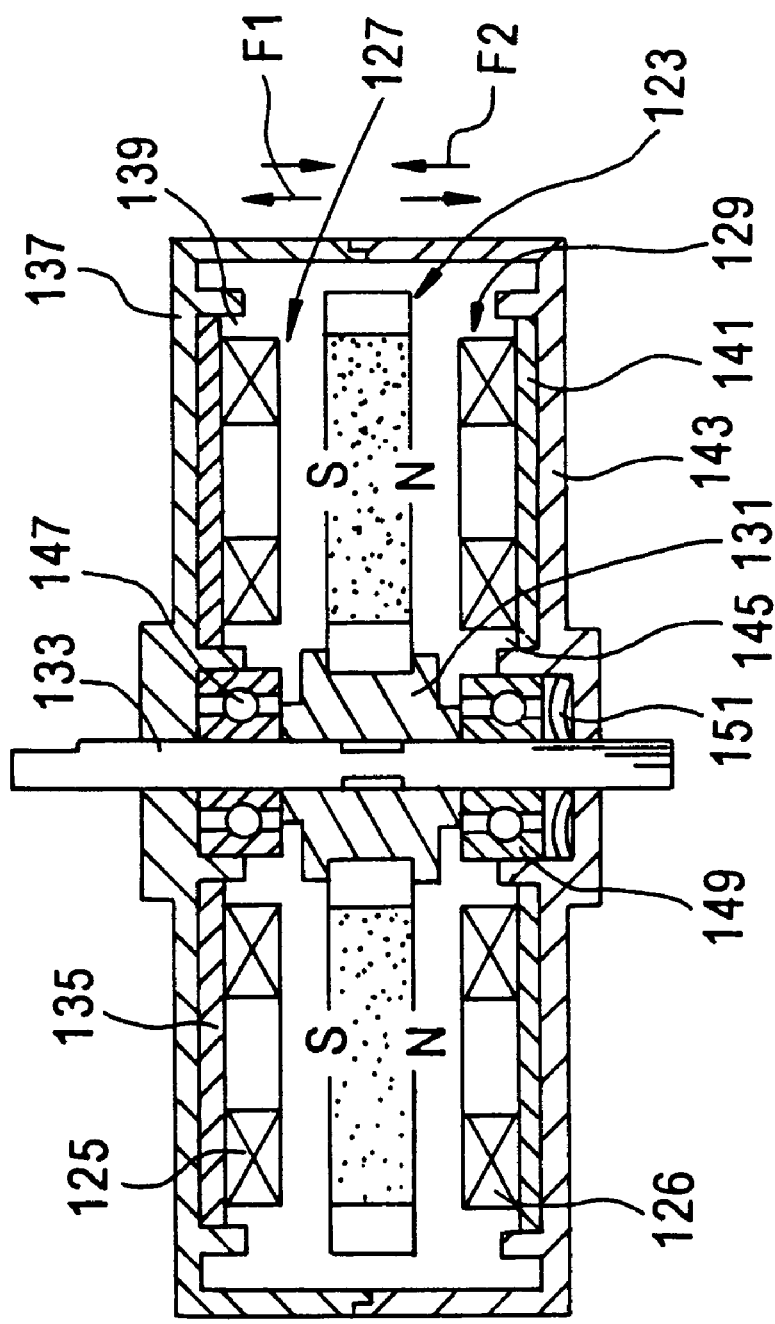
FIG. 7 is an axial-sectional view illustrating a coreless-type BLDC motor of a double stator-type according to a second embodiment of the present invention.

FIG. 7 illustrates a coreless BLDC motor of a double stator-type according to a second embodiment of the present invention.

The coreless BLDC motor according to this second embodiment includes a rotor 123 having a plurality of magnets 45A through 45H inserted into a support 47, and upper and lower stators 127 and 129 respectively disposed on upper and lower sides of the rotor and having bobbinless stator coils 125 and 126 each respectively mounted thereon.

The rotor 123 is fixedly carried on the rotating shaft 133 through a bushing 131, and, as shown in FIGS. 4A and 4B, has four N-pole magnets 45A through 45D and four S-pole magnets 45E through 45H all of which are inserted into the support 47 which is made of a non-magnetic material.

The rotor 123 may have an integrated multi-polar magnetized structure as shown in FIG. 3.

The upper and lower stators 127 and 129 have the same structure as each other. For example, when a three-stage drive manner is used, the upper stator 127 comprises three stator coils 125 which are coiled around an upper printed circuit board 129 and are connected to each other in a Y-configuration manner. When a two-stage drive manner is used, the upper stator 127 comprises two stator coils 125 which are series connected to each other.

The printed circuit board 135 on which the upper stator coil 125 are wound is fixed on a concave portion 139 formed on the inner side of the upper case 137, and the printed circuit board 141 is fixed on a concave portion 145. The central portions of the upper and lower cases 137 and 143 are rotatably coupled around the rotating shaft 133 of the rotor 123 through upper and lower bearings 147 and 149. In addition, between the lower bearing 149 and the lower case 143, a leaf spring 151 is disposed to damp an up-and-down vibration of the rotor.

The operation and efficiency of the above described coreless BLDC motor according to the second embodiment will be described hereinafter.

In this embodiment, the upper and lower stators 127 and 129 for rotating the rotor 123 are in a symmetry relation and the corresponding upper and lower stator coils 125 and 126 facing each other have coiling and current flow directions so that their magnetic flux directions are opposite to each other.

Therefore, since magnetic forces of the upper and lower stator coils 125 and 126 are opposite to each other, the same repulsive forces F1 or attractions F2 act between the upper and lower stator coils 125 and 126.

At this point, since the repulsive forces F1 or attractions F2 between the rotor 123 and the upper and lower stators 127 and 129 act in the opposite direction to each other, these repulsive forces or attractions are compensated, thereby minimizing the axial vibration.

Like the first embodiment, the above described double stator structure of this second embodiment has the stator coil which is made in an double structure, the current flowing along the coil and the magnetic flux density become two times the single stator structure, thereby increasing a drive torque as many as two times and the output of the motor.

Figure 8:
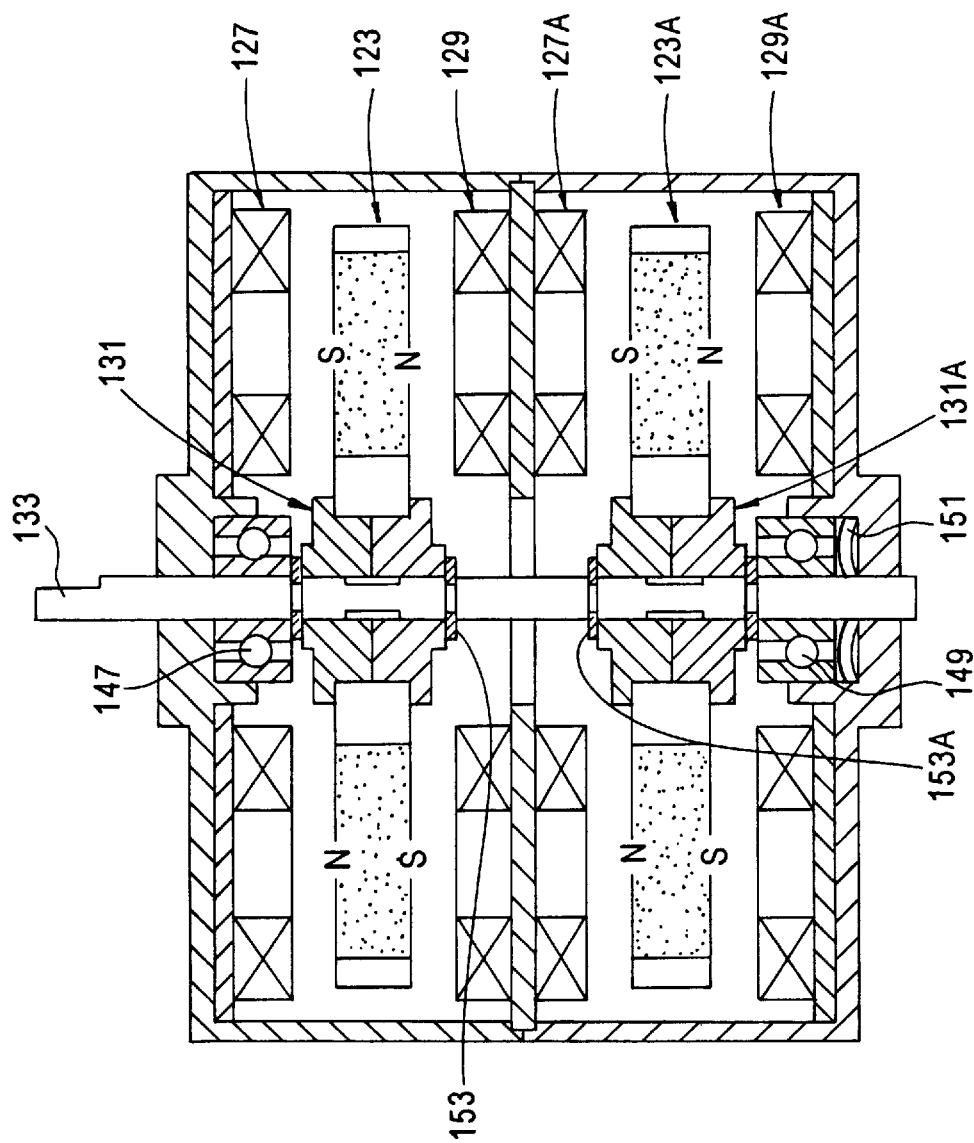
FIG. 8 is a sectional view illustrating a coreless-type BLDC motor of a dual-stage double-stator-type which is a modified example of the second embodiment of the present invention.

FIG. 8 shows a two-stage BLDC motor according to a second embodiment. The two-stage BLDC motor of the second embodiment differs from the single stage BLDC motor in that it has a two-stage structure along the axial direction and E-rings 153 and 153A are coupled to upper and lower sides of bushings 131 and 131A.

Since the operation of this two-stage BLDC motor is the same as that of the single-stage BLDC motor, the description thereof will be omitted herein. This two-stage structure provides a motor having the larger displacement while minimizing the vibration in the axial direction.

Figure 9A:
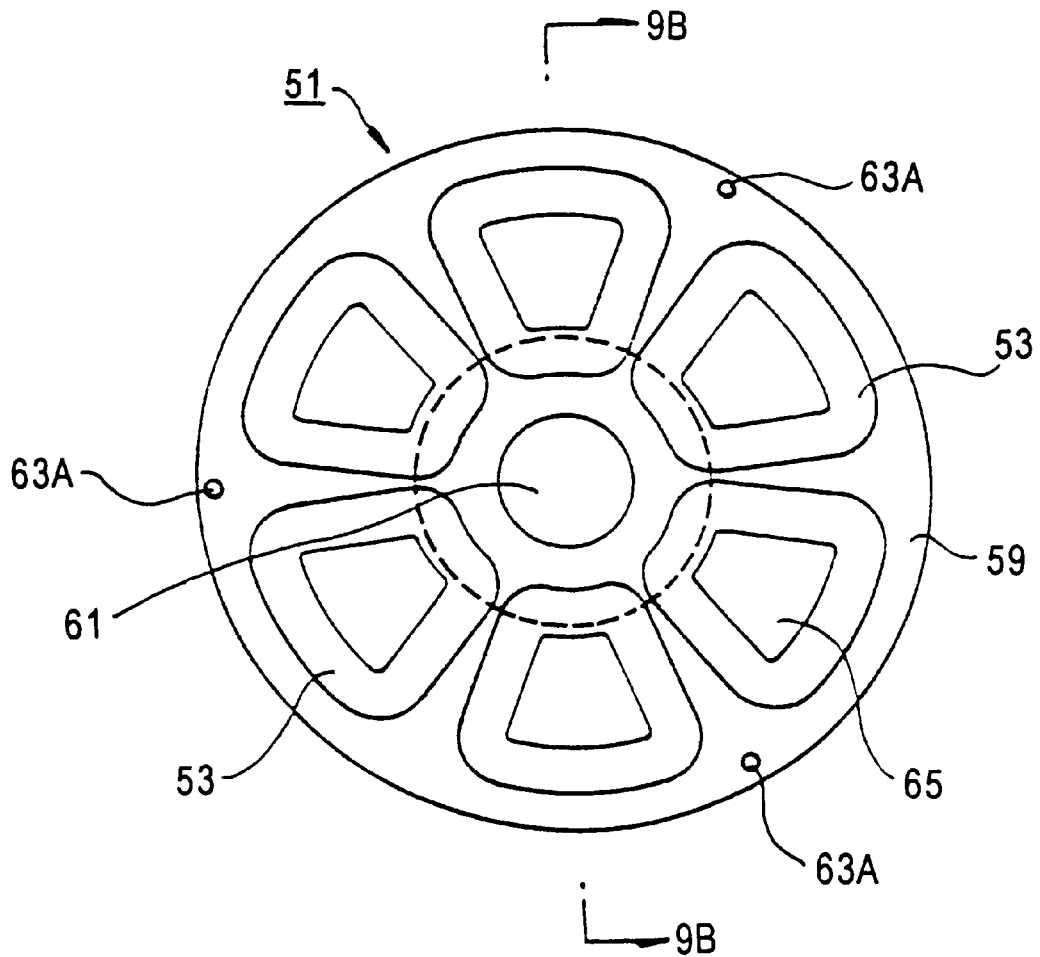
FIGS. 9A and 9B are respectively a plane view of a stator assembly of a bobbin-type according to a third embodiment of the present invention and a sectional view taken along line A—A of FIG. 9A.
Figure 9B:
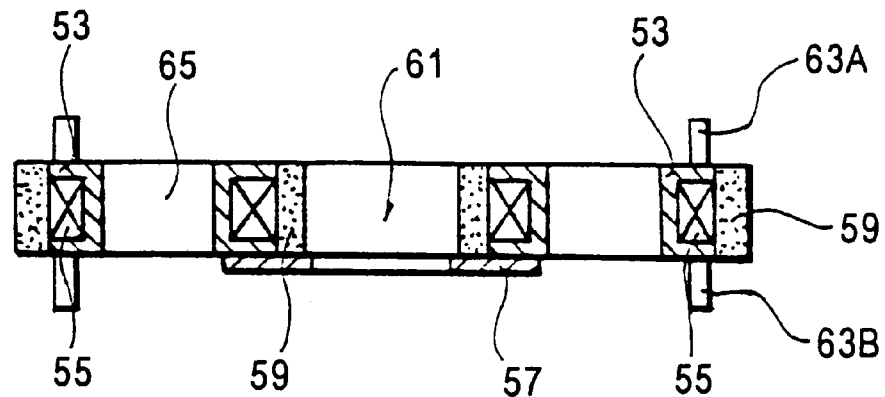

FIGS. 9A and 9B show a bobbin-type stator assembly according to a third embodiment of the present invention.

The bobbin-type stator assembly 51 comprises six bobbins 53 on which coils 55 are wound. These bobbins coils 55 are formed by insert molding method in an annular-shape by a resin insulating material, the coils 55 being connected each other on an auxiliary printed circuit board 57.

Each central portion of the auxiliary printed circuit board 87 and the stator body 59 is provided with a penetrating hole 61. On one side of the stator body 59, an upper terminal 63A for electrically connecting this stator assembly to a control printed circuit board 87 depicted in FIG. 10 and a lower terminal 63B for electrically connecting this stator assembly to another stator assembly when a multiple stacked structure is adapted are formed.

The above described stator assembly comprises, when a three-phase drive manner is used, three stator coils 55 which are coiled around the bobbins 53 each having a hole 65 in a fan-shape and are connected to each other in a Y-configuration manner at the printed circuit board 57, and, when a two-phase drive manner is used, comprises two stator coils 25 which are series connected to each other.

In this embodiment, since each of the bobbin coils 55 is not wound by a exclusive winder and a plastic bobbin 53 is used, a single or multiple axial winder which is easy to automatize can be used to wind the bobbin coils 55, thereby minimizing the manufacturing cost by reducing the expense for facility investment.

In addition, the coils for the bobbin coil 55 can be selected from a normal insulating copper wire which is chipper than the bonding wire used for the bobbinless coil by 25% to 50%, reducing the expense for the coil.

Further, since an exposed portion of each bobbin coil 55 is sealed by resin insulating material, the insulation between the coils 55 can be enhanced as well as the damp-proof.

In addition, since the stator assembly is structured such that the coil 55 is wound around the bobbin and molded in an annular-shape, the mechanical strength can be increased as compared to the conventional one which is designed such that each coil is attached on both sides of the printed circuit board by an adhesive.

In case of a stacked type using the above stator assembly, it is easy to electrically connect, through the upper and lower terminals 63A and 63B, from the control printed circuit board 87 to an adjacent stator assembly, and thus design of motor having high output is also easy and productivity of assemblying becomes high.

Figure 10:
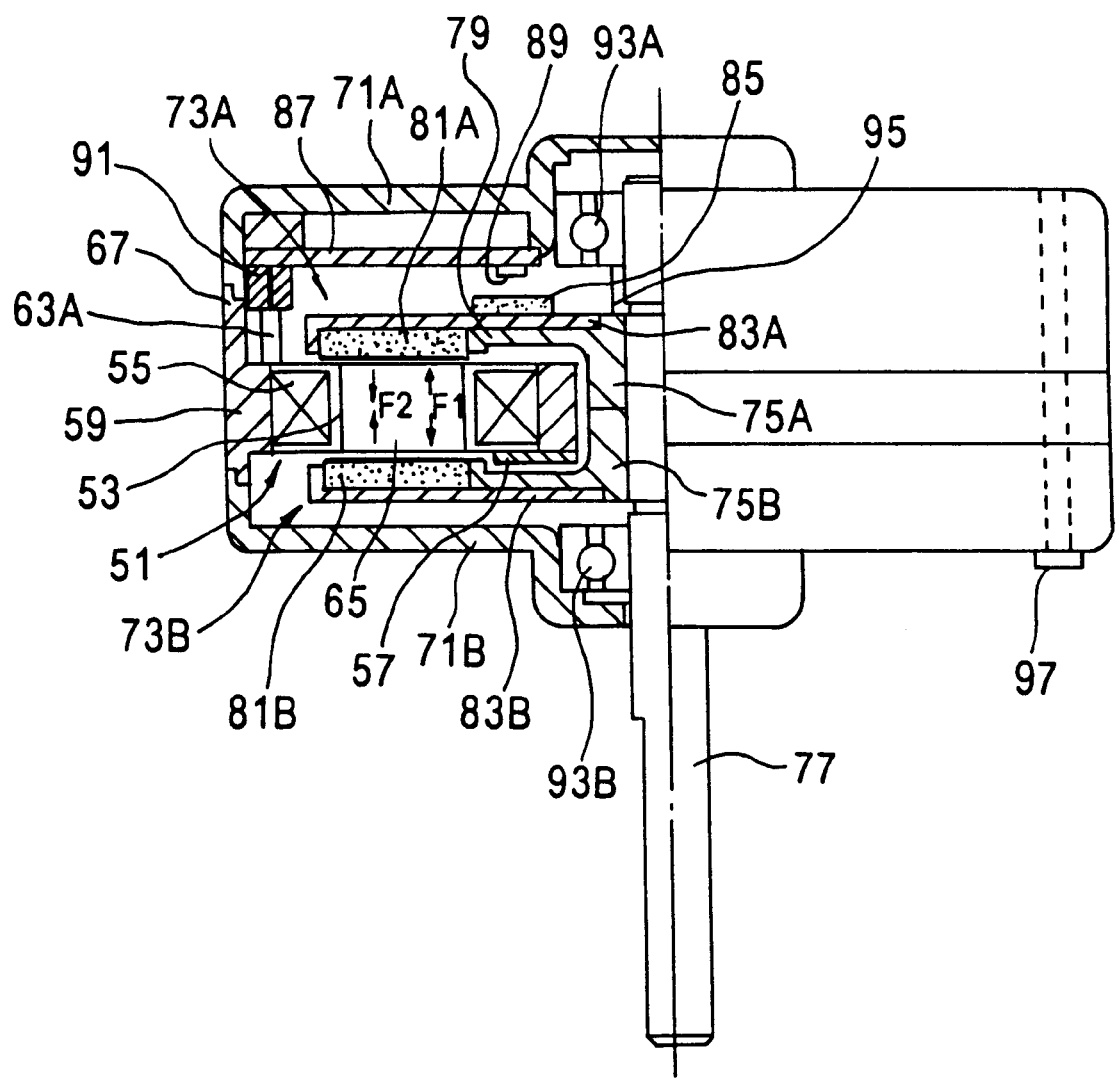
FIG. 10 is a partial axial-sectional view illustrating a coreless-type BLDC motor of a single double-rotor/single stator-type in which a stator assembly of the third embodiment is used.
Figure 11:
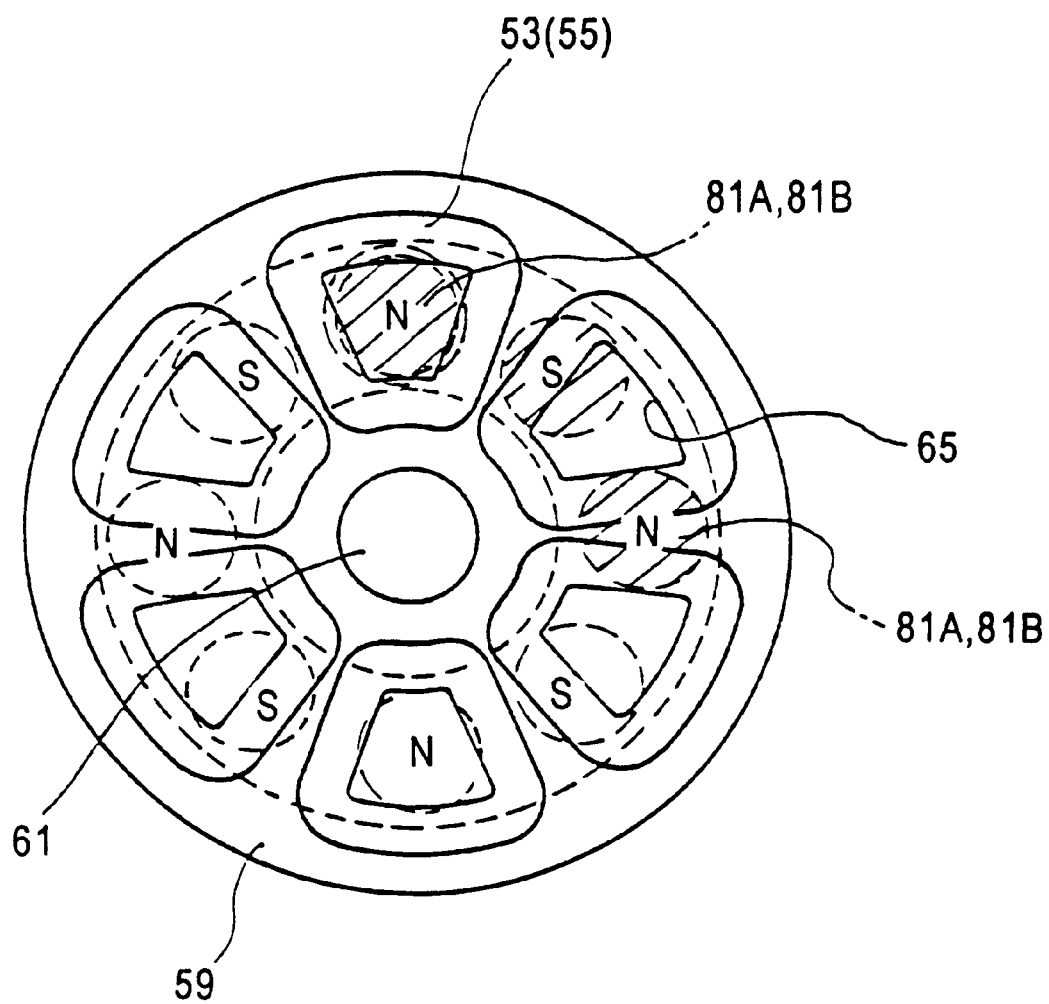
FIG. 11 is a diagram showing an alignment of stator coils and rotor magnets both of which are depicted in FIG. 10.

FIG. 10 shows a coreless-type BLDC motor of a single stage double rotor/single stator-type in which a stator assembly of the third embodiment is used, and FIG. 11 shows an arrangement of stator coils and rotor magnets both of which are depicted in FIG. 10.

In this embodiment, the BLDC motor comprises a control printed circuit board 87 which is mounted inside the motor, and the stator coil 55 which is wound around a bobbin 53 and formed in an annular-shape.

In addition, the motor comprises upper and lower cases 71A and 71B defining a cylindrical case with a stator assembly 51 having an outer circumference 67 extending upward and downward and coupled between the upper and lower cases 71A and 71B.

Upper and lower rotors 73A and 73B each having a maget dividing multi-polarity arrangement structure are fixedly coupled around the rotating shaft 77 through bushings 75A and 75*b* at upper and lower portions of the stator assembly 51.

The respective rotors 73A and 73B have eight magnets 81A and 81B. That is, four disk-type N-polar magnets and four disk-type S-polar magnets are alternately supported on a support 79 integrally formed with the bushings 75A and 75B and made of a polyethylene terephthalate or polybutylene terephthalate, and, on its one side, annular-shaped magnetic yokes 83A and 83B are integrally attached, thereby forming a magnetic circuit with respect to the eight magnets 81.

The arrangement of the magnets 81A and 81B and the coils 55 of the stator assembly 51 is illustrated in FIG. 11. The oblique lined annular-shaped magnets 81A and 81B are disposed corresponding to the penetrating Halls 65 of the coils 55.

An auxiliary magnet 85 for detecting the location of the Hall element is attached on the upper surface of the yoke 83A of the upper rotor 73A. The auxiliary magnet 85 is disposed opposing to the Hall element 89 of the printed circuit board 87 mounted on an inner circumference of the upper case 71A. A female connector 91 to which the upper terminal 63A of the stator assembly 51 is forcedly-coupled is mounted on one side of the control printed circuit board 87.

Upper and lower bearings 93A and 93B are fixed on central concave portions of the upper and lower cases 71A and 71B, respectively. The rotating shaft 77 of the rotors 73A and 73B is rotatably supported through the bearings 93A and 93B.

The reference numerals 95 and 97 indicate respectively a distance maintaining bushing and a screw for fixing the upper and lower cases 71A and 71B.

The BLDC motor according to the third embodiment forms a magnetic field in a predetermined direction when a drive current is applied to the stator coil 55 from the printed circuit board 87 through the upper terminal 63A.

At this point, if the magnets 81A and 81B corresponding to the upper and lower rotors 73A and 73B have an opposite polarity to each other, the same repulsive forces F1 or attractions F2 act between the magnets 81A and 81B of the upper and lower rotors 73A and 73B and the upper and lower side of the stator coil 55.

The repulsive forces F1 or attractions F2 are offset since they act in the opposite direction to each other. As a result, when the rotors 73A and 73B rotate, the axial vibration thereof can be minimized.

This motor according to the third embodiment has the same output efficiency as that of the second embodiment.

Particularly, since this third embodiment motor is structured such that the stator is constituted in a single body and the coil is assembled by using the bobbin, the productivity can be increased and the manufacturing cost can be decreased. In addition, since the overall supporting strength of the motor can be increased, endurance thereof is enhanced.

Further, since the control printed circuit board 87 is mounted inside the motor case, it is possible to make the motor compact and to apply the motor to the various application.

Figure 12:
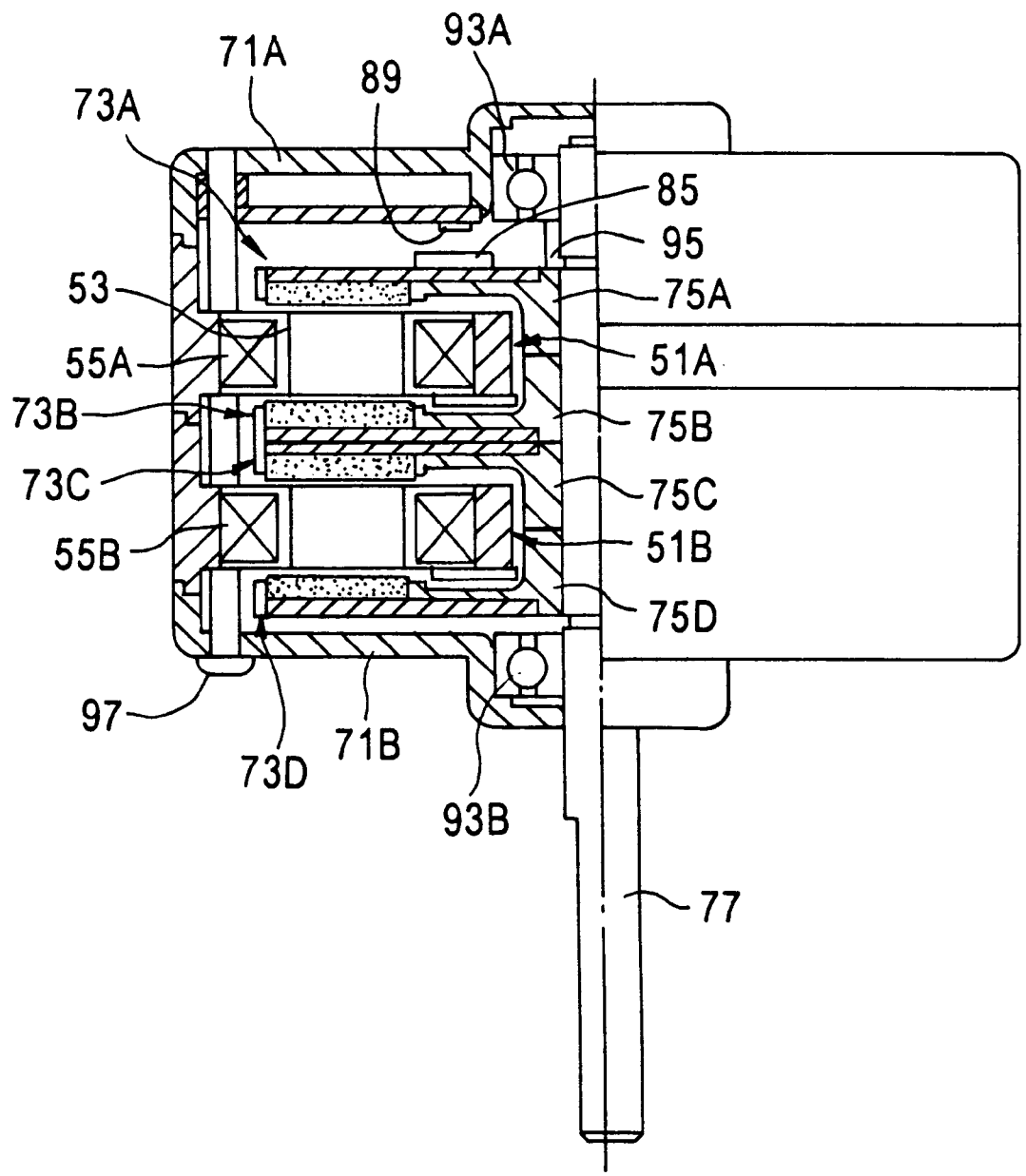
FIG. 12 is a partial axial-sectional view illustrating a coreless-type BLDC motor of a dual-stage double-rotor/stator-type which is a modified example of the third embodiment of the present invention.

FIG. 12 shows a two-stage BLDC motor according to a third embodiment of the present invention.

The BLDC motor includes two stator assemblies 51A and 51B. Upper and lower sides of each of the stator assemblies 51A and 51B are surrounded by double rotors 73A, 73B, 73C and 73D.

Since the operation of this two-stage BLDC motor is the same as that of the one-stage BLDC motor, the description thereof will be omitted herein.

In the structure of the third embodiment, when the output of the motor is increased, since the connection of the stages is achieved by upper and lower terminals (63A and 63B and the clearance between the stages is automatically adjusted by bushings 75A through 75D, the structure becomes compact, reducing overall weight of the structure and enhancing productivity.

Figure 13A:
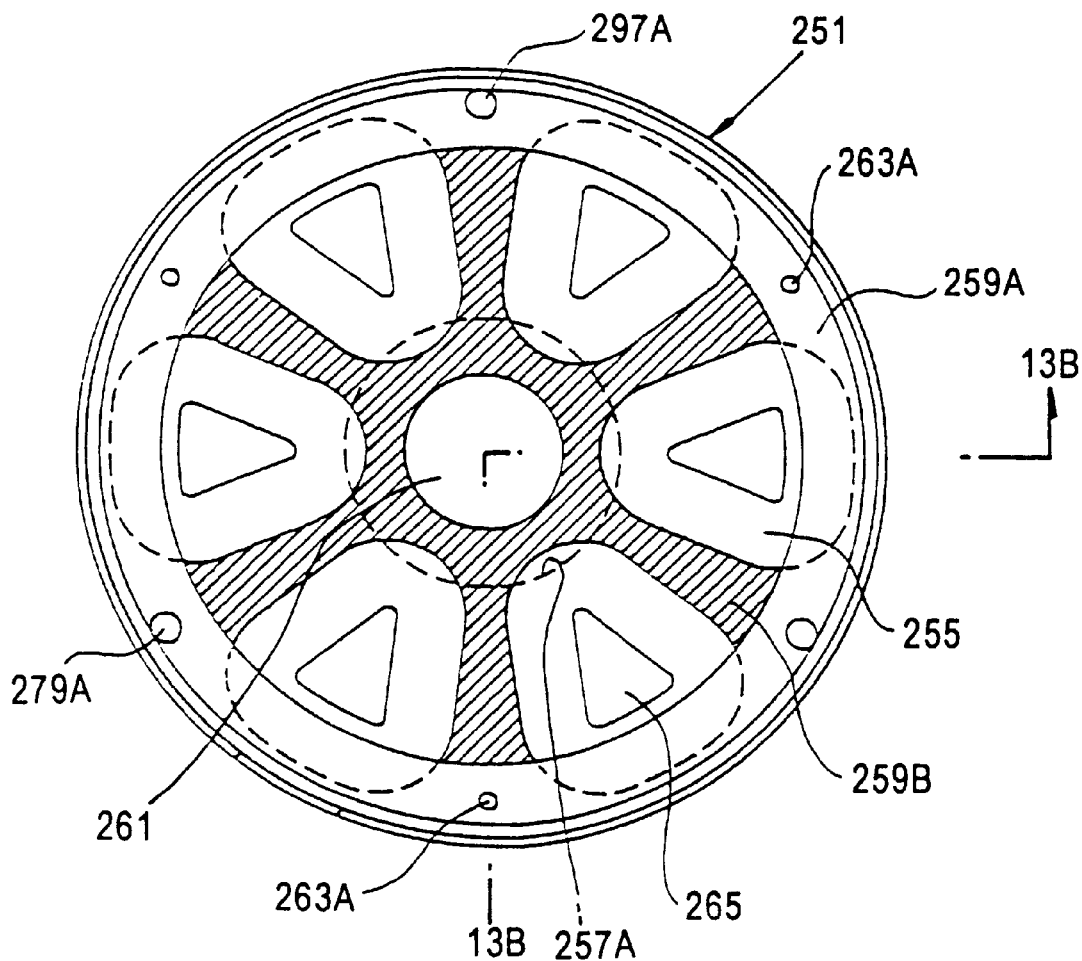
FIGS. 13A, 13B, and 13C are respectively top plan, side elevation, and bottom plan views of a fourth embodiment of the invention.
Figure 13B:
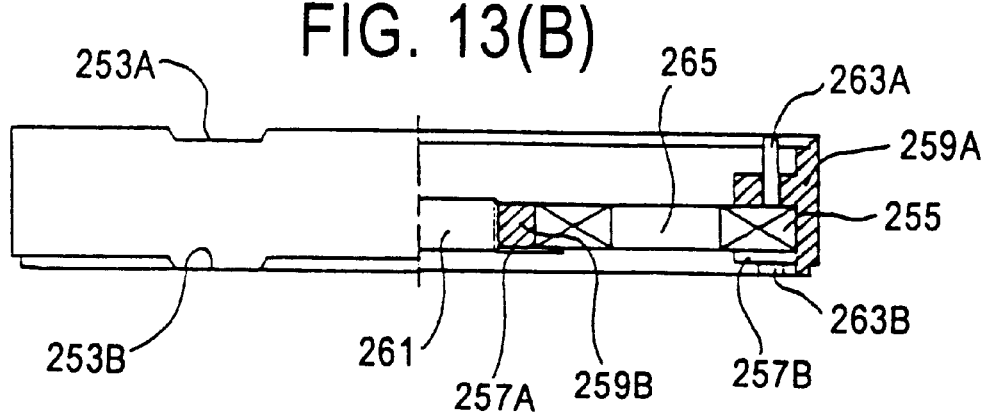
Figure 13C:
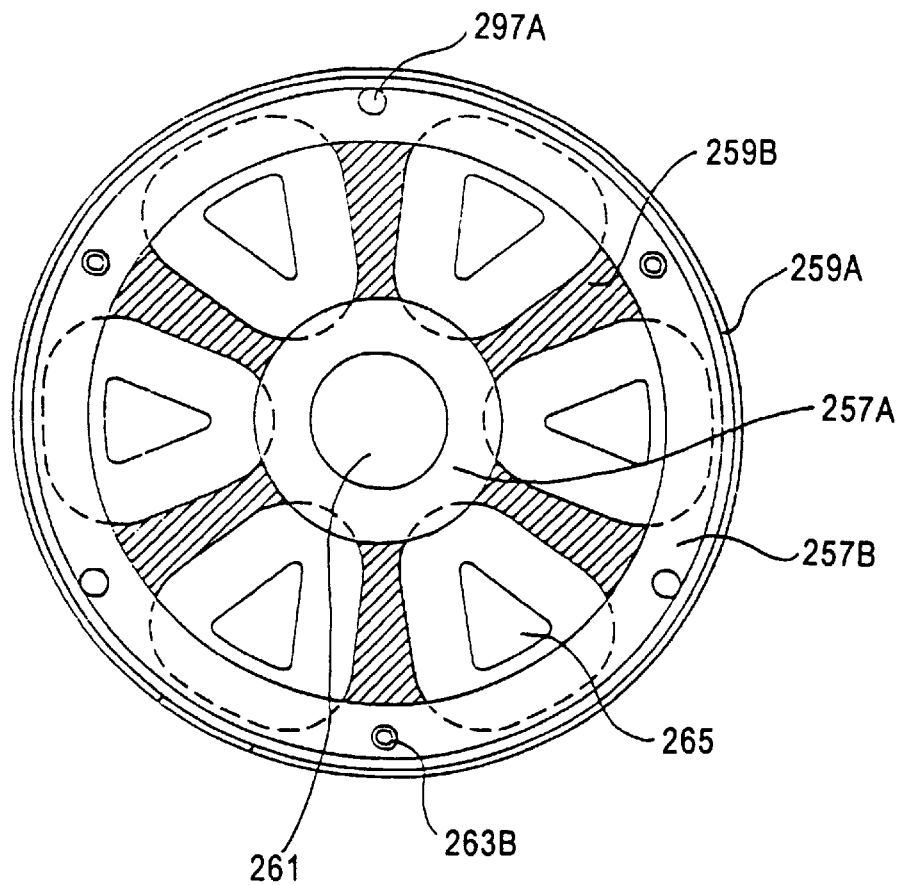

FIGS. 13A and 13B show a stator assembly according to a fourth embodiment of the present invention.

In this embodiment, bobbinless coils 255 are used instead of the bobbin coils described in the third embodiment. The bobbinless coils 255 are integrally formed on the stator assembly 251 in an insert molding manner.

That is, six bobbinless coils 255 are attached on an annular short ring 257A made of a conductive material to connect netural point of the bobbinless coils 255 to each other and an annular auxiliary printed circular board 157B by using an assembling jig.

Next, the coil assembly is mounted on the stator body 259B with an annular stator holder 259A in the insert molding manner, thereby completing the assembly of the stator assembly 251.

At this point, the stator holder 259A is provided with upper terminals 263A and lower terminals 263B connected to the upper terminals. The stator holder 259A is further provided with a plurality of Halls 297A for bolt-coupling to the motor case.

The stator holder 259A is further provided with a key groove 253A and a projection key 253B to provide an automatic alignment when it is assembled with a motor case or a stator of another stage.

Compared with the stator assembly of the third embodiment, when assembling the stator assembly using the bobbinless coil as described above, since the wound width of the coil can be reduced as many as the thickness of the bobbin, density of an interlinking magnetic flux within the air gap increases.

For example, if the thickness is reduced by 0.5 mm×2, the air gap is reduced by 1 mm. As a result, if the air gap is only denoted as a parameter in the same specification, output and efficiency can be increased to 4%.

Figure 15:
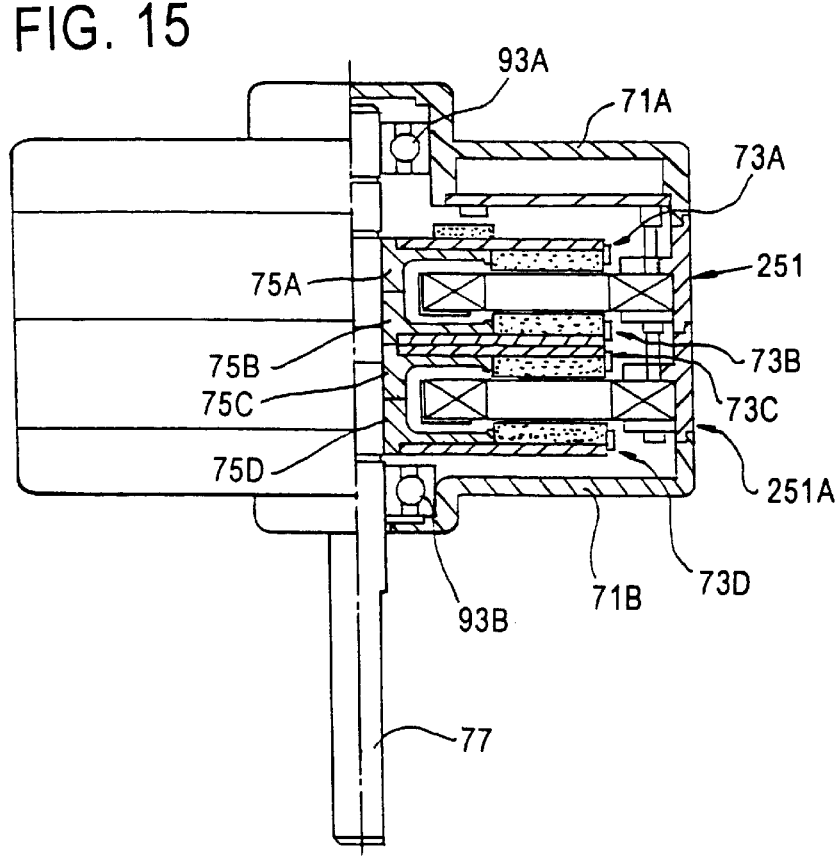
FIG. 15 is an axial-sectional view illustrating a coreless-type BLDC of a dual-stage double rotor/single stator-type according to a fourth embodiment of the present invention.
Figure 14:
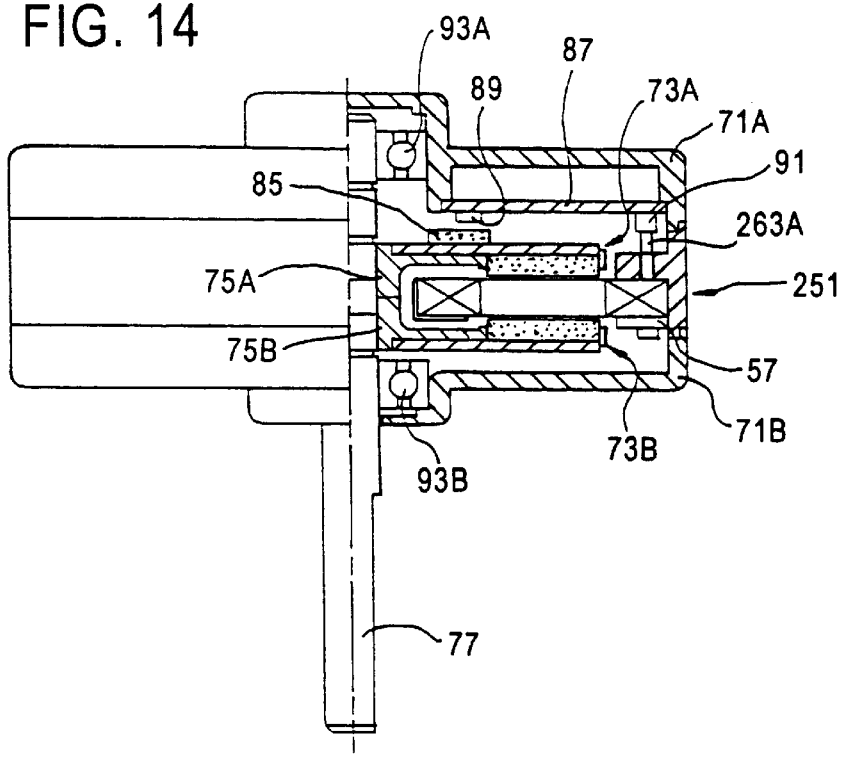
FIG. 14 is a partial axial-sectional view illustrating a coreless-type BLDC motor of a double rotor/single stator type in which the stator assembly according to the fourth embodiment is used.

FIG. 14 shows a coreless-type BLDC motor of a one-stage double rotor/single stator type in which the stator assembly according to the fourth embodiment is used, and FIG. 15 illustrates a coreless-type BLDC of a two-stage double rotor/single stator-type according to a fourth embodiment of the present invention.

Since the operation of this embodiment is the same as that of the first, second or third embodiment, the description thereof will be omitted herein.

Figure 16:
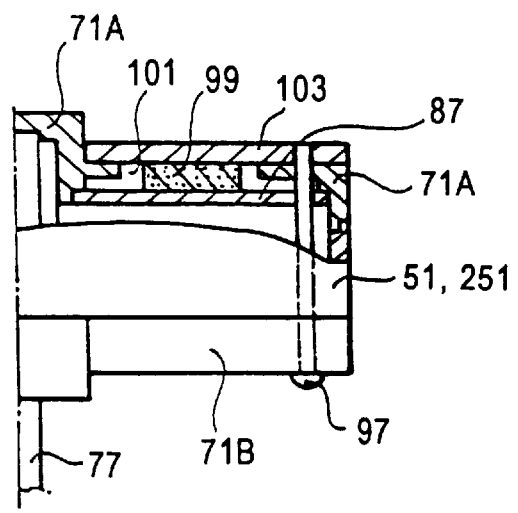
FIG. 16 is a partial cutaway sectional view illustrating a modified example of the motor case.

The motor depicted in FIG. 16 comprises a case which is made of a synthetic resin so as to reduce the weight thereof.

At this point, the upper case 71A can be made of resin material like the stator holder.

In addition, in this embodiment, the upper case is provided at its one side with a hole to discharge heat created in an IC or TR module which is mounted on the upper surface of the printed circuit board 87. On the outer side of the upper case 71A, Al circular plate 103 functioning as a heat sink by contacting the power IC 99 at its lower surface is joined by a plurality of bolts 97.

When the above described motor has the same output as that of the conventional core-type BLDC motor, the size of the former can be reduced to 50% while the weight can be reduced by ⅓ as described hereinbelow.

TABLE 1

| | Output (W) | Size(Diameter × Length) (mm) | Weight (kg) | Remark |
|---|---|---|---|---|
| Core-type BLDC motor | 30 | 92 × 60 | 1.4 | Having internal control PCB |
| Present invention motor | 30 | 92 × 35 | 0.5 | Having internal control PCB |

In the third and fourth embodiments, the rotor may be structurized having an integrated multi-polar magnetized structure depicted in FIG. 3, and the number of bobbinless stator coils mounted on the stator printed circuit board can be varied in accordance with the motor drive manners. In addition, the output of the motor can be easily increased by increasing the stacked stage number of the motor.

In addition, the key groove and the projection key are also applicable to the first to third embodiments, and the assembling method of the fourth embodiment can be used for the third embodiment.

EXAMPLE

Figure 1:
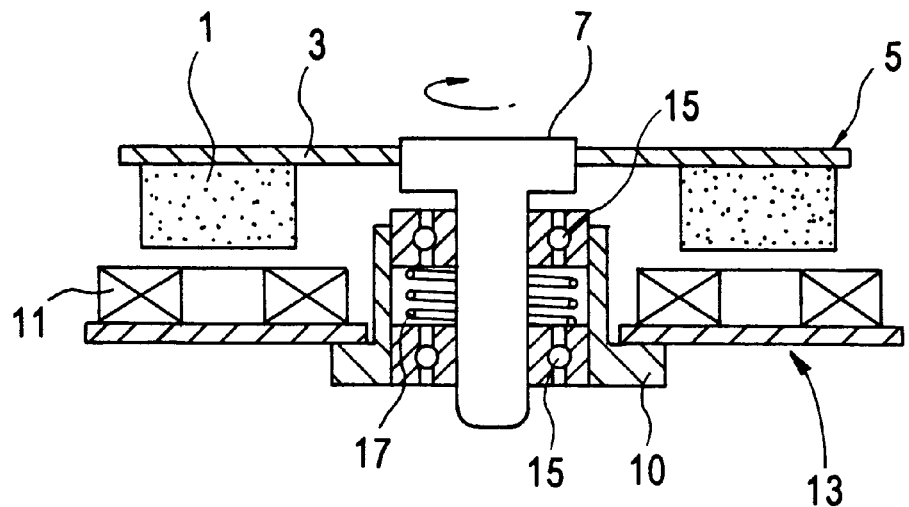
FIG. 1 is an axial-sectional view illustrating a conventional coreless BLDC motor.

Electrical characteristics (on the basis of DC 24V) and a vibration mode of the conventional motor depicted in FIG. 1 and the present motor are measured by using apparatuses which will be described hereinbelow.

* Equipments Used for Measurement *

A. Vibration pickup and amplifying portions: KEYENCE GA-245
B. Storage scope: TEKTRONICS TDS 320
C. DC power source: HANIL ELECTRONIC CO 303 B
D. Applicable torque: 2.1 kgf·cm
E. V·A meter: YOKOGAWA

TABLE 2

| | Electrical characteristic | |
|---|---|---|
| | Present invention | Prior art (FIG. 1) |
| No-Load current | 400 mA | 75 mA |
| Load current | 700 mA | 1.1 A |
| No-load RPM | 1230 rpm | 1651 rpm |
| Load RPM | 930 rpm | 850 rpm |

As can be seen in Table 2, when being subjected to a load, the motor of the present invention has a load current less than that of the prior motor. This means that consumption power of the present motor is remarkably reduced as compared with of the prior motor.

In addition, when being subjected to predetermined torque (i.e., 2.1 kgf·cm), the load rpm of the present motor is higher than that of the prior motor. This means that the torque of the present motor is distinctly increased as compared with the prior motor.

Figure 17A:
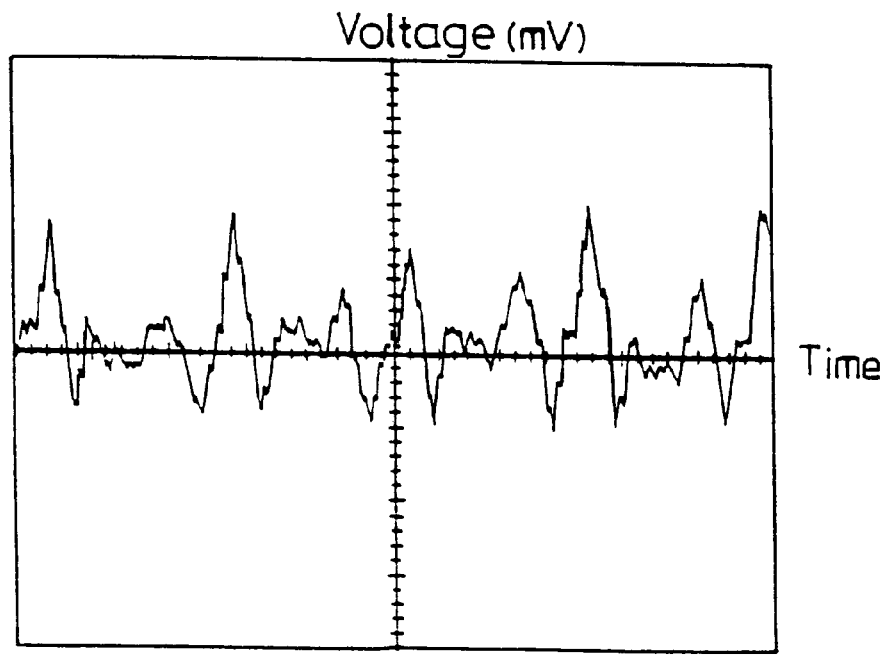
FIGS. 17A and 17B are grapes each illustrating the amount of the oscillation of a conventional single rotor BLDC motor and a double rotor/stator BLDC motor according to the present invention respectively.
Figure 17B:
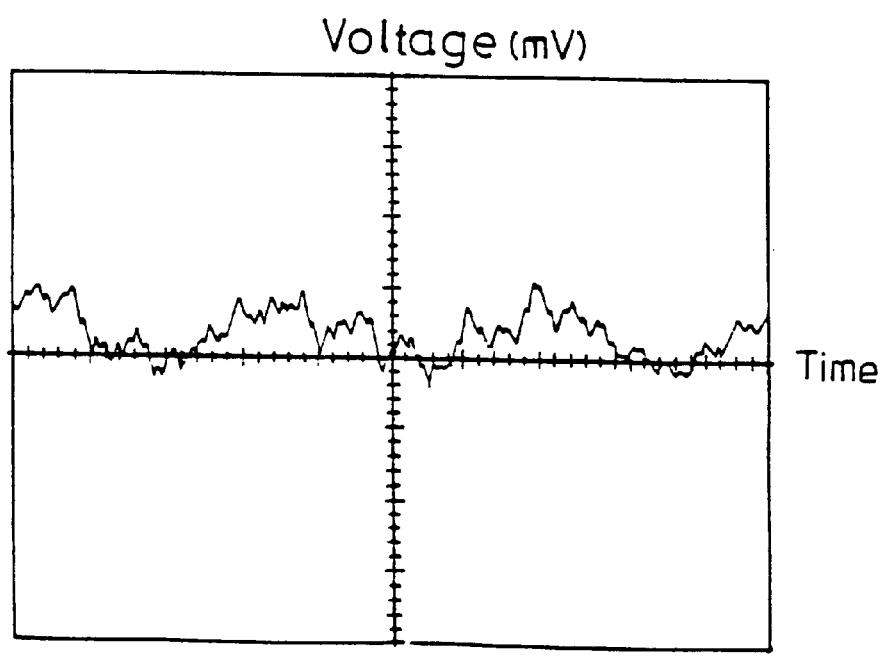

FIG. 17B shows that the vibration amount of the present motor is reduced to half that of the prior motor illustrated in FIG. 17A.

The above described motors according to the first to fourth embodiments use a closed case. In a fifth embodiment, an air cooling structure for solving a heat discharging problem caused by the closed case) is explained.

Figure 18:
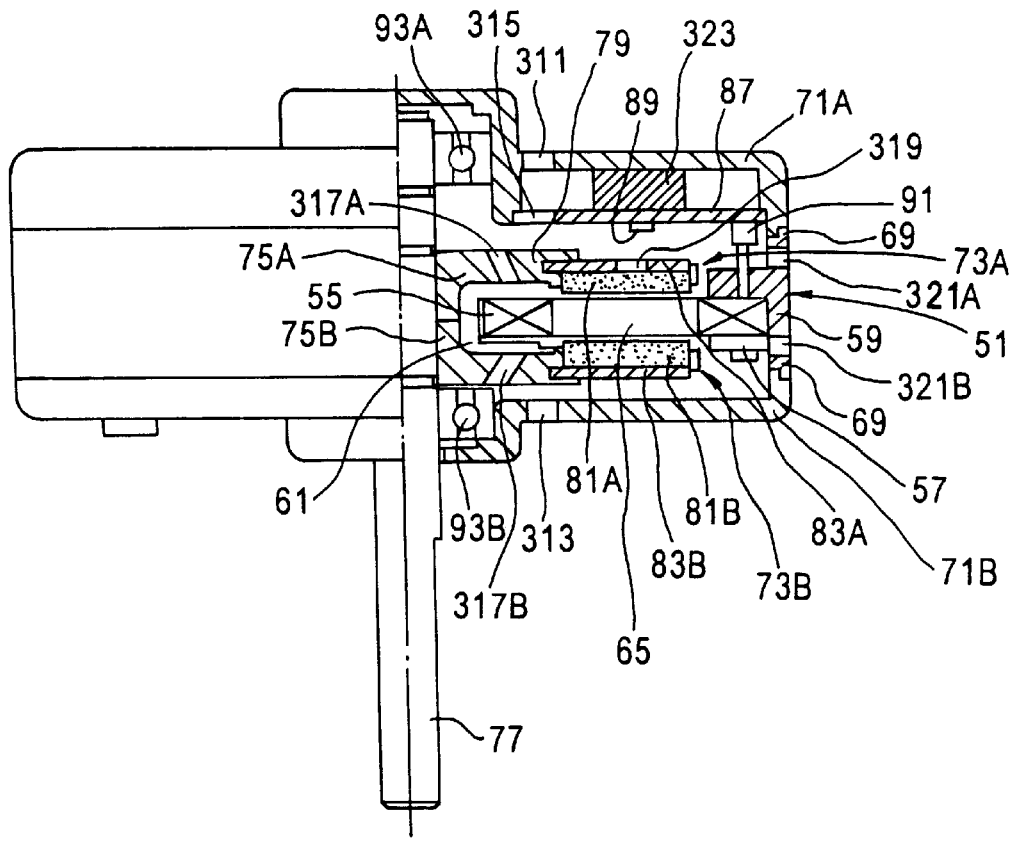
FIG. 18 is an axial-sectional view illustrating a double rotor BLDC motor having an air cooling structure according to the fifth embodiment of the present invention.
Figure 19:
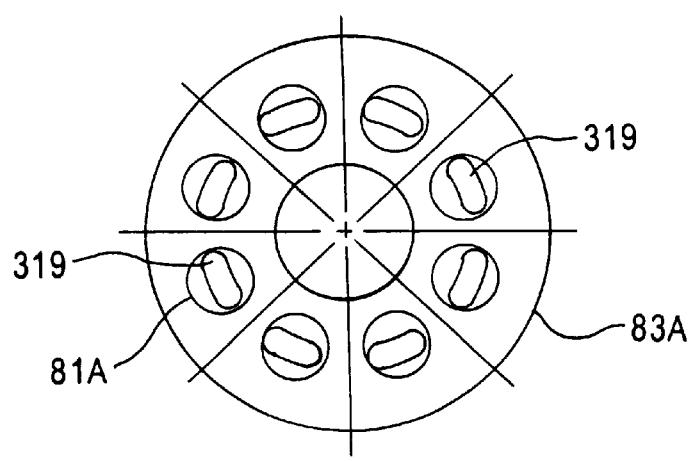
FIG. 19 a schematic plane view illustrating an arrangement of the magnet and a magnet yoke provided with magnetic flux leak holes.

That is, FIG. 18 shows a double rotor BLDC motor according to the fifth embodiment, in which the motor has an air cooling structure, and FIG. 19 shows an aligning of magnets and magnet yokes each provided with magnetic leakage holes.

The motor according the fifth embodiment has the same operation as that of the fourth embodiment. Therefore, the same reference numbers are used in FIG. 18 to refer to the same or like parts depicted in FIG. 14 illustrating the fourth embodiment.

Referring to FIG. 18, the reference numbers 51, 55, 57, 59, 61, 63, 65, 67, 71A, 71B, 73A, 73B, 77, 79, 87, 89, 91, and 97 indicate a stator, coil, auxiliary printed circuit board, stator body, hole, connecting terminal, hole, outer circumference of the stator, upper case, lower case, upper rotor, lower rotor, rotating shaft, support, control printed circuit board, Hall element, connecting terminal, and screw, respectively. In addition, the reference numbers 75A and 75B represent bushings, 81A and 81B represent magnets, 83A and 83B indicate magnet yokes, and 93A and 93B represent upper and lower bearings.

In this fifth embodiment, a plurality of ventilating holes 311, 313, 315 are provided to the upper and lower cases 71A and 71B and the control printed circuit board 87. Additional ventilating holes 317A and 317B corresponding to the ventilating holes 311, 313 and 315 are magnet yokes 83A and 83E of the upper and lower rotors 73A and 73B, and the support 79.

At this point, the auxiliary magnet for detecting the location of the Hall element is omitted by the arrangement of the ventilating holes 317A and 317B while the mounting location of the Hall element 89 is shifted. In addition, as shown in FIG. 19, a magnetic leakage hole 319 is formed on the magnet yoke 83A facing the Hall element 89, thereby allowing the Hall element 89 to detect leakage magnetic flux.

The ventilating holes 311, 313, 315, 317A and 317B are formed at the predetermined same distance along the circumference. To increase heat discharging efficiency, the ventilating holes 317A and 317B are formed inclining to an inside or to a rotating direction.

In addition, on the outer circumference 67 of the stator, a plurality of ventilating holes 321A and 321B are formed to exhaust air induced into the motor through the ventilating holes 311, 313, 315, 317A and 317B.

The air cooling operation of the motor having the above described air cooling structure will be described hereinafter.

When a motor control signal is transferred to the control printed circuit board 87, a stator drive signal is induced from a control integrated circuit and an output transistor 323 to the stator coil 55 through the connecting terminals 91 and 63A.

As a result, the upper and lower rotors 73A and 73B comes to rotate. At this point, air coming through the ventilating hole 311 of the upper case 71A passes through the ventilating hole 315 of the control printed circuit 87 and the ventilating hole 317A of the upper rotor, and is exhausted to the air through the ventilating hole 321A via a gap between the coil 55 and the magnet 81A.

In addition, air coming through the ventilating hole 313 of the lower case as the rotors 73A and 73B rotate passes through the ventilating hole 317B of the lower rotor 73B, and is then exhausted to the air through the ventilating hole 321B formed on the outer circumference of the stator via a gap between the coil 55 and the magnet 81B.

In this embodiment, since the auxiliary magnet required to detect the rotating position of the rotors 73A and 73 is not used, and leakage magnetic flux of the magnet 81A is detected by the Hall element 89, the manufacturing cost can be reduced.

At this point, the distribution difference of the magnetic field created in accordance with a diameter D1 of the magnet yoke 83A may be increased. Therefore, an appropriate diameter D1 should be determined by the following formula:

$$D1=(D2-D3)-2$$

where, the D2 is a diameter of the printed circuit board of the and the D3 is an inner diameter of the magnet.

Figure 21:
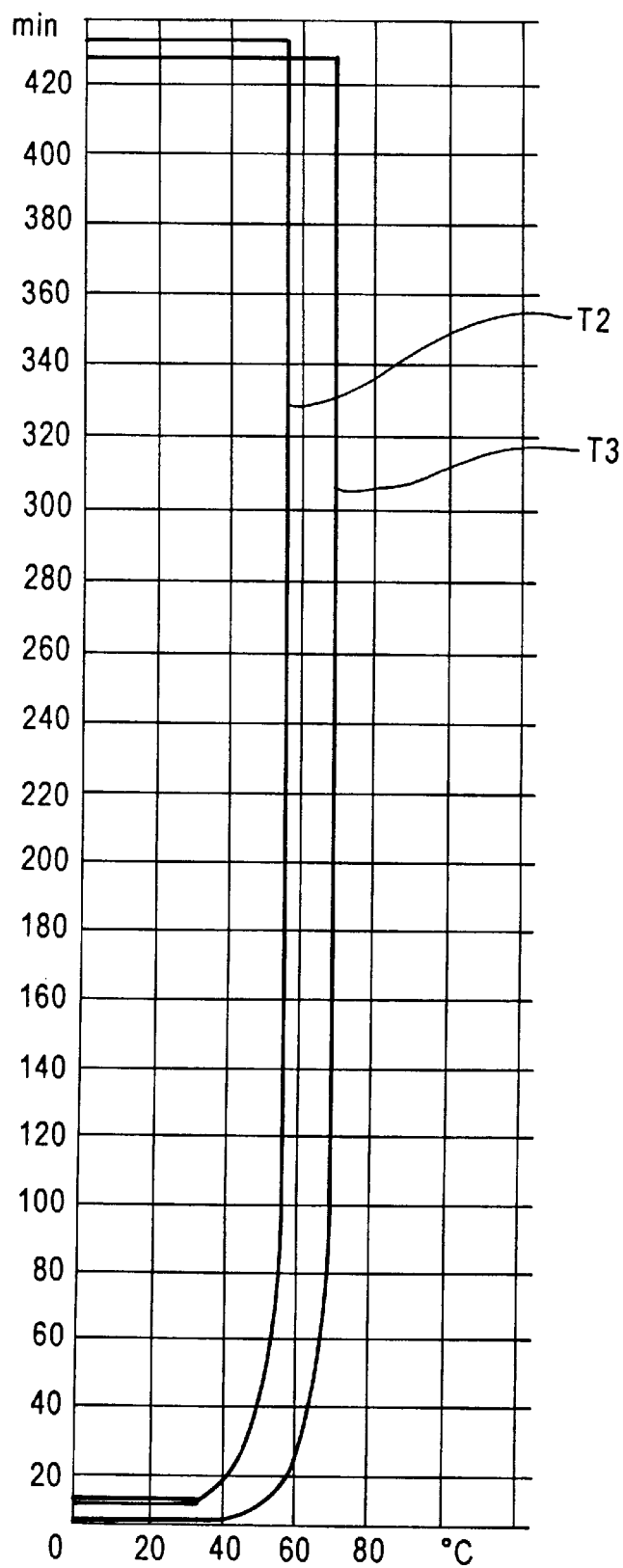
FIG. 21 is a graph illustrating a temperature of a condenser and a transistor according to a driving time when an air cooling motor of the fifth embodiment is used.

By providing the air cooling structure as described above, the temperatures T1, T2 and T3 of the stator coil, condenser and transistor with respect to a voltage, current, and rpm are illustrated in Table 3. In addition, as can be seen from FIG. 21, even if continuously operating the motor for 5 hours, the temperatures T1, T2 and T3 are respectively maintained at maximum temperatures of 61.8° C., 67.9° C. and 66.0° C.

TABLE 3

| Voltage (V) | Current (mA) | RPM | Coil (T1) | Condenser (T2) | TR (T3) | Time (min) | T: (° C.) Remark |
|---|---|---|---|---|---|---|---|
| 43 | 850 | 1380 | 29 | 28 | 28 | 0 | |
| 43 | 900 | 1380 | 42 | 43 | 51 | 10 | |
| 43 | 900 | 1376 | 51.5 | 49.4 | 58.3 | 20 | |
| 43 | 900 | 1385 | 55.9 | 52.8 | 61.9 | 30 | |
| 43 | 900 | 1383 | 57.7 | 54.3 | 63.6 | 40 | |
| 43 | 910 | 1390 | 59.3 | 55.0 | 64.7 | 50 | |
| 43 | 900 | 1380 | 60.3 | 56 | 65.5 | 60 | |
| 43 | 900 | 1385 | 60.8 | 56.6 | 66.0 | 100 | |
| 43 | 900 | 1384 | 60.9 | 57.0 | 66.2 | 120 | |
| 43 | 900 | 1385 | 60.8 | 57.3 | 66.3 | 140 | |
| 43 | 910 | 1390 | 61.4 | 57.9 | 66.9 | 160 | |
| 43 | 900 | 1380 | 60.6 | 56.6 | 66.9 | 180 | |
| 43 | 910 | 1385 | 61.1 | 56.4 | 66.9 | 210 | |
| 43 | 910 | 1387 | 61.8 | 56.7 | 66.3 | 230 | |
| 43 | 910 | 1392 | 61.2 | 56.6 | 66.7 | 250 | |
| 43 | 910 | 1386 | 61.1 | 56.8 | 66.3 | 370 | |

Figure 20:
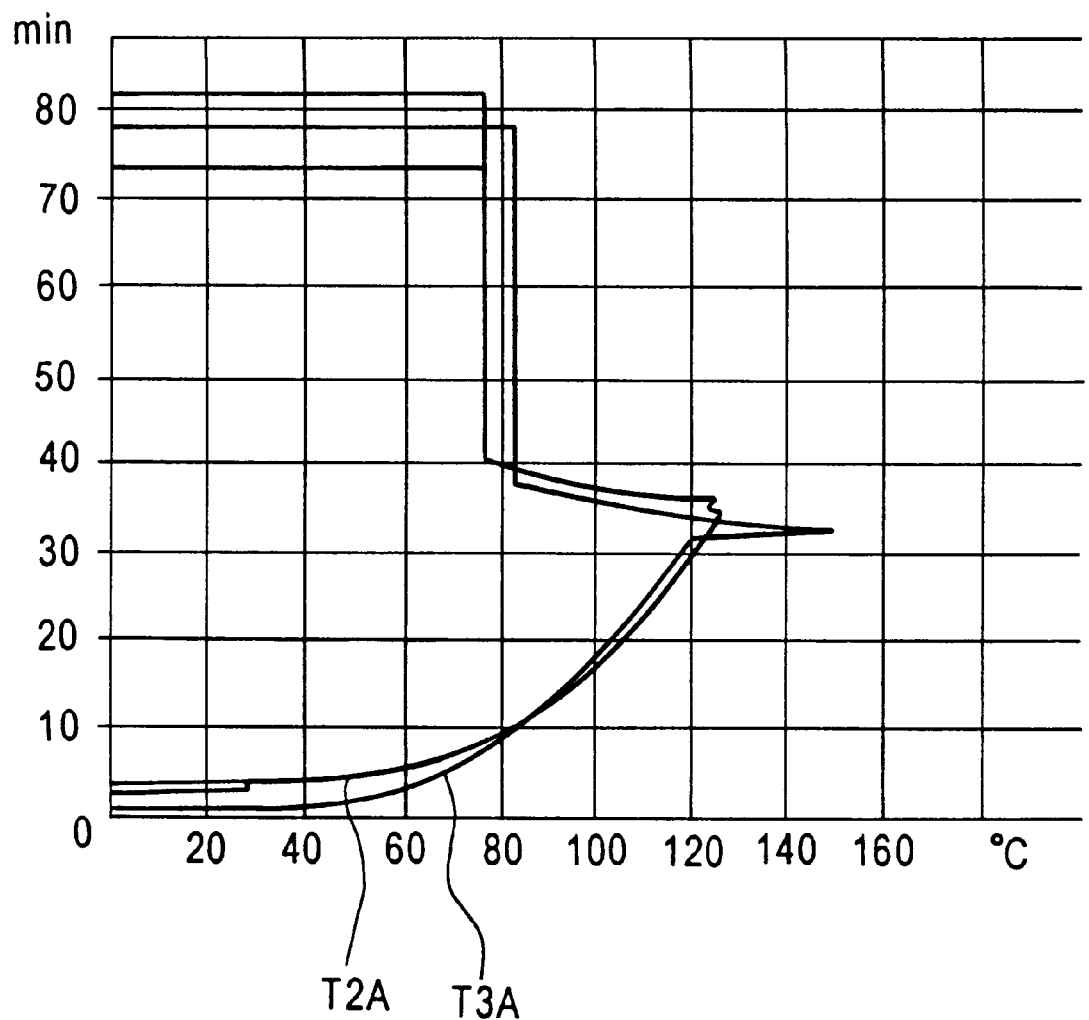
FIG. 20 is a graph illustrating a temperature of a condenser and a transistor according to a driving time when a closed-type drive motor is used.

The below Table 4 illustrates the temperatures T1A, T2A and T3A of the stator coil, condenser and transistor with respect to a voltage, current, and rpm of a closed motor. As can be seen in FIG. 20, even when continuously operating the motor for 30 minutes, the temperatures T1A, T2A and T3A are respectively increased to 100° C., 123.0° C., 145.0° C. and then abruptly dropt.

TABLE 4

| Voltage (V) | Current (mA) | RPM | Coil (T1) | Condenser (T2) | TR (T3) | Time (min) | T: (° C.) Remark |
|---|---|---|---|---|---|---|---|
| 43 | 950 | 1330 | 26.6 | 26.4 | 27 | 0 | |
| 43 | 1000 | 1330 | 47.9 | 87.6 | 78.7 | 10 | |
| 43 | 1100 | 1323 | 64.0 | 108.2 | 99.6 | 20 | |
| 43 | 920 | 1330 | 74.0 | 113.0 | 121.7 | 30 | |
| 43 | 960 | 1325 | 78.5 | 145.0 | 123.0 | 33 | |
| 43 | 1000 | 1330 | 69.9 | 85.0 | 77.7 | 36 | TR broken |

As described above, the fifth embodiment maintains that the temperature T3 of the transistor is about 67° C. even if continuously operation the motor for 5 hours, but the transistor of the closed motor has failed at the time of 36 minutes.

As described above, by forming a plurality of holes on the double rotor and the upper and lower cases to discharge heat created by the driving coil and the driving element within the motor, the motor can be maintained at a relatively lower temperature, thereby preventing the output reduction and thermal runaway of the output transistor.

While this invention has been described in connection with what is presently considered to be the most practical and preferred embodiments, it is to be understood that the invention is not limited to the disclosed embodiments, but, on the contrary, it is intended to cover various modifications and equivalent arrangements included within the spirit and scope of the appended claims.

What is claimed is:

1. A double rotor/single stator-type brushless direct-current motor, comprising:

first and second annular-shaped rotors arranged at a predetermined distance from each other, each of said first and second rotors having a plurality of alternatively arranged north-polar and south polar magnets;

a rotating shaft connected to a central portion of the rotors through a bushing, said shaft having an axis;

upper and lower cases rotatably supporting the rotating shaft; and electromagnetic drive and axial vibration preventing means for generating rotational drive and preventing axial vibration associated with the rotational drive generation, said electromagnetic drive and axial vibration preventing means comprising:

a coreless type stator having a plurality of stator coils for applying electromagnetic force to the first and second rotors, each of said coils being wound around a bobbin, said stator being mounted between the first and second rotors and formed in an annular shape by molding filler, an outer circumference of said stator being supported between said upper and lower cases, the coils of said stator having windings through which an electric current flows to produce magnetic fluxes which have opposite axial polarity orientations and produce electromagnetic forces which act in opposite directions and which are applied to said first and second rotors in opposite directions when the magnets of said first and second rotors which are respectively exposed thereto have the same polarities, and so that the coils respectively produce magnetic fluxes which have the same axial polarity orientation and produce electromagnetic forces which act in opposite directions when the magnets of said first and second rotors which are respectively exposed thereto have opposite polarities, wherein said stator comprises:

a stator body for supporting the wound coils in an annular shape and sealing an exposed portion of the wound coils, and a printed circuit board mounted directly against one face of the stator body for electrically interconnecting the coils thereon.

2. A double rotor/single stator-type brushless direct-current motor according to claim 1, further comprising a short ring interconnecting a neutral point of the coils.

3. A double rotor/single stator-type brushless direct-current motor according to claim 1, wherein the stator is provided with a key groove and a projection key so as to automatically align the upper and lower cases when assembling the cases.

4. A double rotor/single stator-type brushless direct-current motor according to claim 1, further comprising a control printed circuit board applying a drive current with respect to the stator, the control printed circuit board being mounted on one side of one of the upper and lower cases.

5. A double rotor/single stator-type brushless direct-current motor according to claim 4, wherein the stator is provided at a first side with a first terminal for a connection with the control printed circuit board and at a second side with a second terminal for a connection with the another stator.

6. A double rotor brushless direct-current motor, comprising:

first and second annular-shaped rotors each having a plurality of north and south polar magnets which are alternatively disposed at a predetermined distance from each other;

a rotating shaft connected to a central portion of the rotors through a bushing;

upper and lower cases receiving and rotatably supporting opposite ends of the rotating shaft;

electromagnetic drive and axial vibration preventing means for generating rotational drive and preventing axial vibration associated with the rotational drive generation, said electromagnetic drive and axial vibration preventing means comprising:

an annular-shaped coreless stator having a plurality of stator coils supported by a molding filler, each of said plurality of stator coils being wound around a bobbin said plurality of stator coils applying electromagnetic force to the first and second rotors, said stator being mounted between the first and second rotors at a predetermined clearance with respect thereto, the coils of said stator having windings through which an electric current flows to produce magnetic fluxes which have opposite axial polarity orientations and produce electromagnetic forces which act in opposite directions and which are applied to said first and second rotors in opposite directions when the magnets of said first and second rotors which are respectively exposed thereto have the same polarities, and so that the coils respectively produce magnetic fluxes which have the same axial polarity orientation and produce electromagnetic forces which act in opposite directions when the magnets of said first and second rotors which are respectively exposed thereto have opposite polarities; and a printed control circuit board for applying a driving current to the stator, the printed control circuit board being mounted on one of the upper and lower cases;

wherein the upper and lower cases, the control printed circuit board, the first and second rotors each respectively having a plurality of ventilating holes therein for circulating external air through the inside of the motor.

7. A double rotor brushless direct-current motor according to claim 6, each of ventilating holes is formed in each of the upper and lower cases, the control printed circuit board, and the first and second rotors, each of them being arranged corresponding to each other, at equal width, in close proximate to the rotating shaft.

8. A double rotor brushless direct-current motor according to claim 6, wherein additional ventilating holes are further provided on the upper and lower cases and an outer circumference of the stator.

9. A double rotor/single stator-type coreless brushless direct-current motor according to claim 6, further comprising: a magnetic yoke for the rotor, said magnetic yoke being provided with a plurality of magnetic leakage holes through which magnetic flux can leak; and a Hall element disposed on a rear face of the control printed circuit board.

10. A double rotor/single stator-type brushless direct-current motor, comprising:

first and second annular-shaped rotors arranged at a predetermined distance from each other, each of said first and second rotors having a plurality of alternatively arranged north-polar and south polar magnets;

a rotating shaft connected to a central portion of the rotors through a bushing, said shaft having an axis;

upper and lower cases rotatably supporting the rotating shaft;

electromagnetic drive and axial vibration preventing means for generating rotational drive and preventing axial vibration associated with the rotational drive generation, said electromagnetic drive and axial vibration preventing means comprising:

an annular-shaped coreless stator having a plurality of stator coils supported by a molding filler, said plurality of stator coils being wound on bobbins, formed by molding filler and arranged to apply electromagnetic force to the first and second rotors, said stator being mounted between the first and second rotors at a predetermined clearance with respect thereto, an outer circumference of said stator being fixed between said upper and lower cases, the coils of said stator having windings through which an electric current flows to produce magnetic fluxes which have opposite axial polarity orientations and produce electromagnetic forces which act in opposite directions and which are applied to said first and second rotors in opposite directions when the magnets of said first and second rotors which are respectively exposed thereto have the same polarities, and so that the coils respectively produce magnetic fluxes which have the same axial polarity orientation and produce electromagnetic forces which act in opposite directions when the magnets of said first and second rotors which are respectively exposed thereto have opposite polarities;

a printed control circuit board for applying a driving current to the stator, the printed control circuit board being mounted on one of the upper and lower cases; and ventilation hole means formed in the upper and lower cases, the control printed circuit board, the first and second rotors, for circulating external air through the inside of the motor.

11. A double rotor/single stator-type coreless brushless direct-current motor according to claim 10, wherein said stator comprises a plurality of wound coils, a stator body for supporting the wound coils in an annular shape and sealing an exposed portion of the wound coils, and which further comprises an auxiliary printed circuit board mounted on a face of the stator body for electrically interconnecting the coils.

12. A double rotor/single stator-type coreless brushless direct-current motor according to claim 10, wherein the stator is provided at a first side with a first terminal for connection with the printed control circuit board, and with a second terminal on a second side for connection with another stator.

13. A double rotor/single stator-type coreless brushless direct-current motor according to claim 10, further comprising:

a magnetic yoke for the rotor, said magnetic yoke being provided with a plurality of magnetic leakage holes through which magnetic flux can leak; and a Hall element disposed on a rear face of the printed control circuit board.

14. A double rotor/single stator-type brushless direct-current motor comprising:

first and second annular-shaped rotors arranged at a predetermined distance from each other, each of said first and second rotors having a plurality of alternatively arranged north-polar and south polar magnets;

a rotating shaft connected to a central portion of the rotors through a bushing, said shaft having an axis;

upper and lower cases rotatably supporting the rotating shaft; and electromagnetic drive and axial vibration preventing means for generating rotational drive and preventing axial vibration associated with the rotational drive generation, said electromagnetic drive and axial vibration preventing means comprising:

a coreless type stator having a plurality of stator coils for applying electromagnetic force to the first and second rotors, said stator being mounted between the first and second rotors and formed in an annular shape by molding filler, an outer circumference of said stator being supported between said upper and lower cases, the coils of said stator having windings through which an electric current flows to produce magnetic fluxes which have opposite axial polarity orientations and produce electromagnetic forces which act in opposite directions and which are applied to said first and second rotors in opposite directions when the magnets of said first and second rotors which are respectively exposed thereto have the same polarities, and so that the coils respectively produce magnetic fluxes which have the same axial polarity orientation and produce electromagnetic forces which act in opposite directions when the magnets of said first and second rotors which are respectively exposed thereto have opposite polarities; said motor further comprising:

a control printed circuit board applying a drive current with respect to the stator, the control printed circuit board being mounted an one side of one of the upper and lower cases;

wherein the stator is provided at a first side with a first terminal for a connection with the control printed circuit board and at a second side with a second terminal for a connection with the another stator; and wherein said first and second rotors, said stator and said control printed circuit board are arranged radially with respect to the axis of said shaft and essentially parallel with respect to each other.

* * * * *